(12) United States Patent
Igarashi

(10) Patent No.: US 10,809,993 B2
(45) Date of Patent: Oct. 20, 2020

(54) SYSTEM, MANAGEMENT DEVICE, INFORMATION PROCESSING DEVICE, CONTROL METHOD FOR MANAGEMENT DEVICE, CONTROL METHOD FOR INFORMATION PROCESSING DEVICE, AND COMPUTER-READABLE STORAGE MEDIUM

(71) Applicant: CANON KABUSHIKI KAISHA, Tokyo (JP)

(72) Inventor: Toshiaki Igarashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 77 days.

(21) Appl. No.: 15/443,962

(22) Filed: Feb. 27, 2017

(65) Prior Publication Data

US 2017/0255456 A1 Sep. 7, 2017

(30) Foreign Application Priority Data

Mar. 1, 2016 (JP) .................................. 2016-039057

(51) Int. Cl.
*G06F 8/61* (2018.01)
*G06F 9/445* (2018.01)
(Continued)

(52) U.S. Cl.
CPC ................ *G06F 8/61* (2013.01); *G06F 8/654* (2018.02); *G06F 9/44505* (2013.01); *G06F 8/71* (2013.01)

(58) Field of Classification Search
CPC ..... G06F 8/60; G06F 8/61; G06F 8/63; G06F 8/64; G06F 8/65; G06F 8/654;
(Continued)

(56) References Cited

U.S. PATENT DOCUMENTS 7,191,935 B1 * 3/2007 Brausch .............. G06F 9/44505
235/379
7,415,707 B2 * 8/2008 Taguchi .................... G06F 8/61
717/174
(Continued)

FOREIGN PATENT DOCUMENTS

JP 2012226662 A 11/2012

OTHER PUBLICATIONS

IBM, "A system to manage remotely located information processing devices," IPCOM000032934D, Nov. 19, 2004. (Year: 2004).*

*Primary Examiner* — Andrew M. Lyons
(74) *Attorney, Agent, or Firm* — Canon U.S.A., Inc. I.P. Division

(57) ABSTRACT

According to one embodiment, a setting information file set in a reference information processing device is acquired in a management device, and a specific designatable item in the setting information file set by the reference information processing device is edited. An instruction describing an automatic setting procedure to be executed by a target information processing device is generated. A setting information file identified by an acquisition request received from the target information processing device is sent to the target information processing device in response to the acquisition request, the target information processing device sending the acquisition request in response to execution of the automatic setting procedure instruction by the target information processing device. Thus, a specific item can be detected from the setting information file acquired by the target information processing device, and device information managed by the target information processing device is set to the detected specific item.

11 Claims, 27 Drawing Sheets

| SETTING ITEM ID | SETTING ITEM NAME | TYPE | VALUE RANGE | VALUE DISPLAY NAME | INITIAL VALUE | CONDITION ID |
|---|---|---|---|---|---|---|
| SleepTime | SLEEP TRANSITION TIME | ENUMERATION TYPE | 1, 5, 10 | 1, 5, 10 (MIN.) | 10 | 3 |
| IPAddress | IP ADDRESS | IP ADDRESS TYPE | — | — | | 1 |
| Location | INSTALLATION LOCATION | CHARACTER STRING TYPE | 0 TO 32 CHARACTERS | — | | 1 |
| DefaultPaperSize | SHEET SIZE INITIAL VALUE | ENUMERATION TYPE | A4, LETTER, B5 | A4, LETTER, B5 | A4 | 2 |
| CassetteAdj | CASSETTE MARGIN ADJUSTMENT | INTEGER TYPE | -50 TO 50 | — | 0 | 1 |

(51) Int. Cl.
*G06F 8/654* (2018.01)
*G06F 8/71* (2018.01)

(58) Field of Classification Search
CPC ... G06F 8/658; G06F 8/66; G06F 8/70; G06F 8/71; G06F 9/44505
USPC .......................................... 717/164, 168–178
See application file for complete search history.

(56) References Cited

U.S. PATENT DOCUMENTS

| | | | | |
|---|---|---|---|---|
| 7,593,121 B2* | 9/2009 | Kobayashi | ................ | G06F 8/60 358/1.13 |
| 7,861,241 B2* | 12/2010 | Kumagai | ................. | G06F 8/65 717/168 |
| 8,095,301 B2* | 1/2012 | Kawamura | ............ | G01C 21/26 701/1 |
| 8,219,653 B1* | 7/2012 | Keagy | ...................... | G06F 8/63 709/222 |
| 8,395,787 B2* | 3/2013 | Shintoku | ................ | G06F 3/1204 358/1.13 |
| 8,601,280 B2* | 12/2013 | Harada | ................. | G06F 21/121 713/189 |
| 8,776,045 B2* | 7/2014 | Yamada | ................... | G06F 9/453 717/175 |
| 8,799,524 B2* | 8/2014 | Nomura | ................ | G06F 3/1204 710/10 |
| 9,207,899 B2* | 12/2015 | Kaneko | ................. | G06F 3/1297 |
| 9,342,290 B2* | 5/2016 | Omura | ................... | G06F 3/1204 |
| 9,658,843 B2* | 5/2017 | Nishikawa | .............. | G06F 8/654 |
| 9,965,299 B2* | 5/2018 | Nakawaki | ........... | G06F 9/44505 |
| 10,037,200 B2* | 7/2018 | Kobayashi | ................ | G06F 8/61 |
| 10,089,102 B2* | 10/2018 | Tokuda | ...................... | G06F 8/65 |
| 2003/0120624 A1* | 6/2003 | Poppenga | .............. | G06F 9/4411 |
| 2004/0031030 A1* | 2/2004 | Kidder | ....................... | G06F 1/14 717/172 |
| 2004/0045000 A1* | 3/2004 | Hara | ......................... | G06F 8/61 717/178 |
| 2004/0148367 A1* | 7/2004 | Takano | ................ | G06F 9/44505 709/220 |
| 2004/0153532 A1* | 8/2004 | Hosotani | ............ | H04L 41/0803 709/222 |
| 2004/0153869 A1* | 8/2004 | Marinelli | ................... | G06F 8/61 714/47.1 |
| 2004/0190057 A1* | 9/2004 | Takahashi | ............ | G06F 3/1205 358/1.15 |
| 2004/0194082 A1* | 9/2004 | Purkeypile | ................ | G06F 8/63 717/174 |
| 2004/0212829 A1* | 10/2004 | Uchida | ................ | G06F 9/4411 358/1.15 |
| 2005/0044280 A1* | 2/2005 | Reisman | .................... | G06F 8/65 710/1 |
| 2005/0091346 A1* | 4/2005 | Krishnaswami | .... | G06F 9/44505 709/220 |
| 2005/0132091 A1* | 6/2005 | Shibata | ..................... | G06F 8/65 710/4 |
| 2005/0159926 A1* | 7/2005 | Saito | .................... | G06F 9/44505 702/186 |
| 2005/0192928 A1* | 9/2005 | Kofuji | ................. | G06F 9/44505 |
| 2005/0204355 A1* | 9/2005 | Yoda | ..................... | G06F 9/4411 717/176 |
| 2005/0210459 A1* | 9/2005 | Henderson | ................. | G06F 8/65 717/168 |
| 2006/0101459 A1* | 5/2006 | Crosier | ............... | H04L 41/0806 717/174 |
| 2006/0136872 A1* | 6/2006 | Barr | ..................... | G06F 9/44505 717/114 |
| 2006/0224780 A1* | 10/2006 | Saito | .................. | G06F 3/1204 710/8 |
| 2007/0055976 A1* | 3/2007 | Ward | ........................ | G06F 8/34 719/329 |
| 2007/0171466 A1* | 7/2007 | Shigeeda | .............. | G06F 21/335 358/1.15 |
| 2007/0174497 A1* | 7/2007 | Wakai | ................. | G06F 9/44505 710/8 |
| 2008/0088865 A1* | 4/2008 | Nagai | .................... | G06F 3/1205 358/1.13 |
| 2008/0154974 A1* | 6/2008 | Obata | ................. | G06F 11/1435 |
| 2008/0178212 A1* | 7/2008 | Kinoshita | ........... | H04L 12/2812 725/32 |
| 2008/0209449 A1* | 8/2008 | Maehira | .............. | G06F 9/44505 719/321 |
| 2008/0250317 A1* | 10/2008 | Evans | ................... | G06F 3/0481 715/712 |
| 2008/0263231 A1* | 10/2008 | Henry | ................ | H04N 1/00204 710/9 |
| 2008/0320468 A1* | 12/2008 | Ferris | ........................ | G06F 8/61 717/174 |
| 2009/0063611 A1* | 3/2009 | Igarashi | ................... | G06F 8/65 709/201 |
| 2009/0144629 A1* | 6/2009 | Ferlitsch | ................. | H04L 41/00 715/736 |
| 2009/0144727 A1* | 6/2009 | Felts | ......................... | G06F 8/60 717/175 |
| 2009/0177684 A1* | 7/2009 | Williamson | ........ | G06F 9/44505 |
| 2009/0262392 A1* | 10/2009 | Tanaka | .................. | G06F 3/1204 358/1.15 |
| 2010/0106821 A1* | 4/2010 | Akiyama | ............... | G06F 16/288 709/224 |
| 2010/0218179 A1* | 8/2010 | Balascio | ................... | G06F 8/65 717/171 |
| 2010/0281476 A1* | 11/2010 | Ebi | ....................... | G06F 3/1285 717/174 |
| 2011/0010436 A1* | 1/2011 | Kobayashi | ............ | G06F 15/177 709/221 |
| 2011/0099544 A1* | 4/2011 | Haramiishi | ............ | G06F 8/654 717/168 |
| 2011/0219369 A1* | 9/2011 | Kumagai | ................ | G06F 9/445 717/174 |
| 2011/0252416 A1* | 10/2011 | Kobayashi | ............ | G06F 9/4411 717/174 |
| 2011/0307884 A1* | 12/2011 | Wabe | ........................ | G06F 8/60 717/178 |
| 2012/0072474 A1* | 3/2012 | Sagara | ................... | G06F 3/1204 707/827 |
| 2012/0099135 A1* | 4/2012 | Ono | .......................... | G06F 8/60 358/1.13 |
| 2012/0110489 A1* | 5/2012 | Huttelmaier | .......... | G06F 3/0481 715/771 |
| 2012/0140269 A1* | 6/2012 | Kobayashi | ............ | G06F 3/1208 358/1.15 |
| 2013/0007693 A1* | 1/2013 | Bliss | ......................... | G06F 8/63 717/101 |
| 2013/0067350 A1* | 3/2013 | Kataoka | ............... | G06F 9/44505 715/748 |
| 2013/0125055 A1* | 5/2013 | Nakaya | ................... | G06F 3/0482 715/810 |
| 2013/0138783 A1* | 5/2013 | Mallur | ....................... | G06F 8/65 709/221 |
| 2013/0139139 A1* | 5/2013 | Mallur | ...................... | G06F 8/65 717/170 |
| 2013/0198507 A1* | 8/2013 | Kasuya | ........................ | G06F 1/24 713/100 |
| 2013/0254741 A1* | 9/2013 | Spassov | .................... | G06F 8/71 717/110 |
| 2013/0265601 A1* | 10/2013 | Kaneko | ................ | G06F 3/1297 358/1.13 |
| 2014/0063520 A1* | 3/2014 | Tarumi | ................... | G06F 9/4411 358/1.13 |
| 2014/0189170 A1* | 7/2014 | Takigawa | ................. | G06F 13/12 710/40 |
| 2014/0222771 A1* | 8/2014 | Sekiguchi | ........... | H04L 41/0889 707/694 |
| 2014/0259008 A1* | 9/2014 | Bhattiprolu | ............... | G06F 8/61 717/174 |
| 2014/0365976 A1* | 12/2014 | Morrison | ............ | G06F 3/04842 715/854 |
| 2015/0058836 A1* | 2/2015 | Takazawa | ................ | G06F 8/61 717/174 |

(56) References Cited

U.S. PATENT DOCUMENTS

| | | | |
|---|---|---|---|
| 2015/0067671 A1* | 3/2015 | Kamiya | G06F 8/61 |
| | | | 717/174 |
| 2015/0089490 A1* | 3/2015 | Nakawaki | G06F 8/61 |
| | | | 717/174 |
| 2015/0205593 A1* | 7/2015 | Yokota | G06F 8/71 |
| | | | 717/174 |
| 2016/0036667 A1* | 2/2016 | Kripalani | H04L 41/082 |
| | | | 709/224 |
| 2016/0092281 A1* | 3/2016 | Nakawaki | G06F 9/44505 |
| | | | 719/320 |
| 2016/0110754 A1* | 4/2016 | Miyazaki | G06F 8/61 |
| | | | 705/14.39 |
| 2016/0149885 A1* | 5/2016 | Negoro | G06F 8/61 |
| | | | 726/6 |
| 2016/0253132 A1* | 9/2016 | Nishida | G06F 3/1204 |
| | | | 358/1.15 |
| 2016/0291959 A1* | 10/2016 | Searle | H04L 41/082 |
| 2016/0294605 A1* | 10/2016 | Searle | H04L 41/082 |
| 2017/0003958 A1* | 1/2017 | Okubo | G06F 9/44505 |
| 2017/0212699 A1* | 7/2017 | Hioka | G06F 9/445 |
| 2017/0300696 A1* | 10/2017 | Qin | G06F 21/64 |
| 2018/0302525 A1* | 10/2018 | Han | G06F 3/0482 |
| 2019/0056923 A1* | 2/2019 | Baba | G06F 9/445 |

* cited by examiner

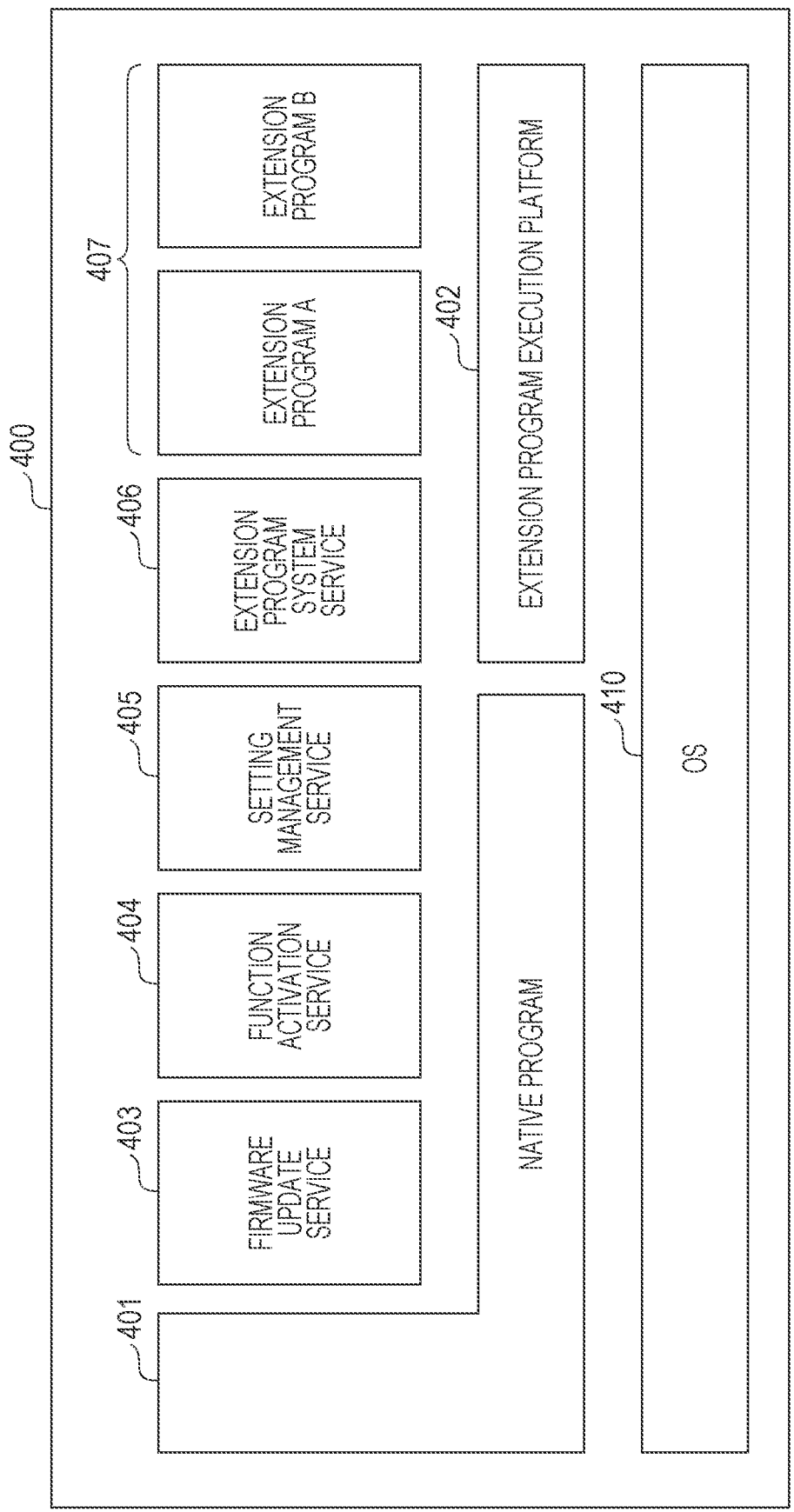

FIG. 5A

| CONDITION ID 501 | CONDITION 502 |
|---|---|
| 1 | SERIAL NUMBER MATCHED |
| 2 | MODEL NAME MATCHED |
| 3 | NO CONDITION |

| SETTING ITEM ID 511 | SETTING ITEM NAME 512 | TYPE 513 | VALUE RANGE 514 | VALUE DISPLAY NAME 515 | INITIAL VALUE 516 | CONDITION ID 517 |
|---|---|---|---|---|---|---|
| SleepTime | SLEEP TRANSITION TIME | ENUMERATION TYPE | 1, 5, 10 | 1, 5, 10 (MIN) | 10 | 3 |
| IPAddress | IP ADDRESS | IP ADDRESS TYPE | — | — | — | 1 |
| Location | INSTALLATION LOCATION | CHARACTER STRING TYPE | 0 TO 32 CHARACTERS | — | — | 1 |
| DefaultPaperSize | SHEET SIZE INITIAL VALUE | ENUMERATION TYPE | A4, LETTER, B5 | A4, LETTER, B5 | A4 | 2 |
| CassetteAdj | CASSETTE MARGIN ADJUSTMENT | INTEGER TYPE | −50 TO 50 | — | 0 | 1 |

| INSTALLATION DATA ID (601) | INSTALLATION DATA NAME (602) | MODEL NAME (603) | FIRMWARE VERSION (604) | SETTING INFORMATION ID (605) | SCRIPT (606) | PROCESSING RESULT (607) |
|---|---|---|---|---|---|---|
| 1 | INSTALLATION DATA 1 | MODEL 1 | 1.00 | S001 | ... | SUCCESS |
| 2 | INSTALLATION DATA 2 | MODEL 1 | 2.00 | S002 | ... | |
| 3 | INSTALLATION DATA 3 | MODEL 2 | 1.50 | S003 | ... | |

| SETTING ITEM ID (611) | FLAG (612) | SLEEP TRANSITION TIME (613) | IP ADDRESS (614) | INSTALLATION LOCATION (615) | SHEET SIZE INITIAL VALUE (616) | CASSETTE MARGIN ADJUSTMENT (617) |
|---|---|---|---|---|---|---|
| S001 | true | 5 MINUTES | 1.2.3.4 | OFFICE ROOM 1 | A4 | 15 |
| S002 | false | 10 MINUTES | 1.2.3.5 | OFFICE ROOM 2 | A3 | -5 |
| S003 | true | — | 1.2.3.6 | OFFICE ROOM 3 | LETTER | 0 |

| CONDITION ID (621) | CONDITION (622) |
|---|---|
| 1 | SERIAL NUMBER MATCHED |
| 2 | MODEL NAME MATCHED |
| 3 | NO CONDITION |

| MODEL ID (631) | MODEL NAME (632) | FIRMWARE VERSION (633) |
|---|---|---|
| 1 | MODEL 1 | 1.00 |
| 2 | MODEL 1 | 2.00 |
| 3 | MODEL 2 | 1.50 |
| 4 | MODEL 2 | 2.50 |

| MODEL ID 651 | SETTING ITEM ID 652 | SETTING ITEM NAME 653 | TYPE 654 | VALUE RANGE 655 | VALUE DISPLAY NAME 656 | INITIAL VALUE 657 | ACQUISITION ID 658 |
|---|---|---|---|---|---|---|---|
| 1 | SleepTime | SLEEP TRANSITION TIME | ENUMERATION TYPE | 1, 5, 10 | 1, 5, 10 (MIN.) | 10 | 3 |
| 1 | IPAddress | IP ADDRESS | IP ADDRESS TYPE | — | — | | 1 |
| 1 | Location | INSTALLATION LOCATION | CHARACTER STRING TYPE | 0 TO 32 CHARACTERS | — | | 1 |
| 1 | DefaultPaperSize | SHEET SIZE INITIAL VALUE | ENUMERATION TYPE | A4, LETTER, B5 | A4, LETTER, B5 | A4 | 2 |
| 1 | CassetteAdj | CASSETTE MARGIN ADJUSTMENT | INTEGER TYPE | -50 TO 50 | — | 0 | 1 |
| 2 | SleepTime | SLEEP TRANSITION TIME | ENUMERATION TYPE | 1, 5, 10, 20 | 1, 5, 10, 20 (MIN.) | 5 | 3 |
| 2 | IPAddress | IP ADDRESS | IP ADDRESS TYPE | — | — | | 1 |
| 2 | Location | INSTALLATION LOCATION | CHARACTER STRING TYPE | 0 TO 32 CHARACTERS | — | | 1 |
| 2 | DefaultPaperSize | SHEET SIZE INITIAL VALUE | ENUMERATION TYPE | A4, LETTER, B5 | A4, LETTER, B5 | LETTER | 2 |
| 2 | CassetteAdj | CASSETTE MARGIN ADJUSTMENT | INTEGER TYPE | -50 TO 50 | — | 0 | 1 |

| MODEL NAME | FIRMWARE VERSION | FIRMWARE | SPECIFICATIONS INFORMATION |
|---|---|---|---|
| MODEL 1 | 1.00 | model1_100.zip | specifications1_100.zip |
| MODEL 1 | 2.00 | model1_200.zip | specifications1_200.zip |
| MODEL 2 | 1.50 | model2_150.zip | specifications2_150.zip |
| MODEL 2 | 2.50 | model2_250.zip | specifications2_250.zip |

FIG. 7B

FIRMWARE LIST

| MODEL NAME | FIRMWARE VERSION |
|---|---|
| MODEL 1 | 1.00 |
| MODEL 1 | 2.00 |
| MODEL 2 | 1.50 |
| MODEL 2 | 2.50 |

[ADD]  [DELETE]

[END]

FIG. 7C

ADD FIRMWARE

FIRMWARE FILE: C:\fw-folder\fw.zip

[OK]  [CANCEL]

FIG. 8A

```xml
<?xml version="1.0" encoding="UTF-8"?>
<DeviceSettings>
  <ControlData>                               801
    <Model>MODEL 1</Model>
    <FWV>1.00</FWV>
    <SN>A001</SN>
  </ControlData>

<Data>                                      802
    <SleepTime>10</SleepTime>
    <IPAddress>1.2.3.4</IPAddress>
    <Location>OFFICE ROOM 1</Location>
    <DefaultPaperSize>A4</DefaultPaperSize>
    <CassetteAdj>15</CassetteAdj>
  </Data>
</DeviceSettings>
```
800

FIG. 8B

```xml
<?xml version="1.0" encoding="utf-8" ?>
<IScriptxmlns:xsi="http://www.XXX.com/XMLSchema">
    <setupId>1</setupId>            821
    <Model>MODEL 1</Model>          822

<!-- Installation Script Commands -->
    <commands>
        <!-- FIRMWARE UPDATE PROCESSING -->
        <updateFirmwareCommand order="1">
            <path>http://contentsServer/xxx</path>        831
            <firmwareVersion>1.00</firmwareVersion>
        </updateFirmwareCommand>

<!-- SETTING INFORMATION PROCESSING -->
        <deviceConfigCommand flag="true" order="2">      832    830
            <confFileId>S001</confFileId>
        </deviceConfigCommand>

<!-- REBOOT PROCESSING -->
        <rebootCommand order="3">                        833
        </rebootCommand>

</commands>
</IScript>
```
820

FIG. 9A

INSTALLATION DATA LIST

| INSTALLATION DATA ID | INSTALLATION DATA NAME | MODEL NAME | FIRMWARE VERSION |
|---|---|---|---|
| 1 | INSTALLATION DATA 1 | MODEL 1 | 1.00 |
| 2 | INSTALLATION DATA 2 | MODEL 1 | 2.00 |
| 3 | INSTALLATION DATA 3 | MODEL 2 | 1.50 |

[CREATE] [EDIT] [DELETE]

[END]

FIG. 9B

EDIT INSTALLATION DATA

INSTALLATION DATA NAME: INSTALLATION DATA 1  MODEL NAME: MODEL 1 ▼

FIRMWARE VERSION: 1.00 ▼

[CREATE]  C:¥folder¥ref.zip  [LOAD]

SETTING INFORMATION FILE: YES  [EDIT]  [DELETE]

[OK]  [CANCEL]

FIG. 9C

```
EDIT SETTING INFORMATION
  ☑ SLEEP TRANSITION TIME:        [ 5 MINUTES ▼ ] ~941
  ☑ IP ADDRESS:                    [ 1.2.3.4 ]     ~942
  ☑ INSTALLATION LOCATION:         [ OFFICE ROOM 1 ] ~943
  ☑ SHEET SIZE INITIAL VALUE:      [ A4 ▼ ]        ~944
  ☐ CASSETTE MARGIN ADJUSTMENT:    [ 15 ]          ~945

946~[ OK ]           [ CANCEL ]~947
```

| INSTALLATION DATA ID | INSTALLATION DATA NAME | MODEL NAME | FIRMWARE VERSION | SETTING INFORMATION ID | SCRIPT | PROCESSING RESULT | INSTALLATION MODE |
|---|---|---|---|---|---|---|---|
| 1 | INSTALLATION DATA 1 | MODEL 1 | 1.00 | S001 | ... | SUCCESS | ADD |
| 2 | INSTALLATION DATA 2 | MODEL 1 | 2.00 | S002 | ... | | REPLACE |
| 3 | INSTALLATION DATA 3 | MODEL 2 | 1.50 | S003 | ... | | |

FIG. 13B

EDIT INSTALLATION DATA

INSTALLATION DATA NAME: INSTALLATION DATA 1    MODEL NAME: MODEL 1 ▶

FIRMWARE VERSION: 1.00 ▶

INSTALLATION MODE: ADD ▶    LOAD    DELETE

CREATE    C:\folder\ref.zip    EDIT

SETTING INFORMATION FILE: YES

OK    CANCEL

FIG. 15A

| SETTING ITEM ID | SETTING ITEM NAME | TYPE | VALUE RANGE | VALUE DISPLAY NAME | INITIAL VALUE | CONDITION ID | RELATED OPTION NAME |
|---|---|---|---|---|---|---|---|
| SleepTime | SLEEP TRANSITION TIME | ENUMERATION TYPE | 1, 5, 10 | 1, 5, 10 (MIN.) | 10 | 3 | |
| IPAddresse | IP ADDRESS | IP ADDRESS TYPE | — | — | | 1 | |
| Location | INSTALLATION LOCATION | CHARACTER STRING TYPE | 0 TO 32 CHARACTERS | — | | 1 | |
| DefaultPaperSize | SHEET SIZE INITIAL VALUE | ENUMERATION TYPE | A4, LETTER, B5 | A4, LETTER, B5 | A4 | 2 | |
| CassetteAdj | CASSETTE MARGIN ADJUSTMENT | INTEGER TYPE | −50 TO 50 | — | 0 | 1 | OPTIONAL CASSETTE |

FIG. 15B

| INSTALLATION DATA ID | INSTALLATION DATA NAME | MODEL NAME | FIRMWARE VERSION | SETTING INFORMATION ID | SCRIPT | PROCESSING RESULT | OPTION |
|---|---|---|---|---|---|---|---|
| 1 | INSTALLATION DATA 1 | MODEL 1 | 1.00 | S001 | ... | SUCCESS | OPTIONAL CASSETTE |
| 2 | INSTALLATION DATA 2 | MODEL 1 | 2.00 | S002 | ... | | FAX |
| 3 | INSTALLATION DATA 3 | MODEL 2 | 1.50 | S003 | ... | | PAPER DECK, FAX |

FIG. 15C

| MODEL ID | SETTING ITEM ID | SETTING ITEM NAME | TYPE | VALUE RANGE | VALUE DISPLAY NAME | INITIAL VALUE | ACQUISITION ID | RELATED OPTION NAME |
|---|---|---|---|---|---|---|---|---|
| 1 | SleepTime | SLEEP TRANSITION TIME | ENUMERATION TYPE | 1, 5, 10 | 1, 5, 10 (MIN.) | 10 | 3 | |
| 1 | IPAddress | IP ADDRESS | IP ADDRESS TYPE | — | — | | 1 | |
| 1 | Location | INSTALLATION LOCATION | CHARACTER STRING TYPE | 0 TO 32 CHARACTERS | — | | 1 | |
| 1 | DefaultPaperSize | SHEET SIZE INITIAL VALUE | ENUMERATION TYPE | A4, LETTER, B5 | A4, LETTER, B5 | A4 | 2 | |
| 1 | CassetteAdj | CASSETTE MARGIN ADJUSTMENT | INTEGER TYPE | −50 TO 50 | — | 0 | 1 | OPTIONAL CASSETTE |
| 2 | SleepTime | SLEEP TRANSITION TIME | ENUMERATION TYPE | 1, 5, 10, 20 | 1, 5, 10, 20 (MIN.) | 5 | 3 | |
| 2 | IPAddress | IP ADDRESS | IP ADDRESS TYPE | — | — | | 1 | |
| 2 | Location | INSTALLATION LOCATION | CHARACTER STRING TYPE | 0 TO 32 CHARACTERS | — | | 1 | |
| 2 | DefaultPaperSize | SHEET SIZE INITIAL VALUE | ENUMERATION TYPE | A4, LETTER, B5 | A4, LETTER, B5 | LETTER | 2 | |
| 2 | CassetteAdj | CASSETTE MARGIN ADJUSTMENT | INTEGER TYPE | −50 TO 50 | — | 0 | 1 | OPTIONAL CASSETTE |

FIG. 16A

EDIT INSTALLATION DATA

INSTALLATION DATA NAME: [INSTALLATION DATA 1] — 921
MODEL NAME: [MODEL 1 ▼] — 922
FIRMWARE VERSION: [1.00 ▼] — 923

OPTION:
- ☐ PAPER DECK
- ☑ OPTIONAL CASSETTE
- ☐ FAX

} — 1601

[CREATE] — 924   [C:¥folder¥ref.zip] — 925   [LOAD] — 926

SETTING INFORMATION FILE: YES — 927   [EDIT] — 928   [DELETE] — 929

930 — [OK]   [CANCEL] — 931

EDIT SETTING INFORMATION

☑ SLEEP TRANSITION TIME: [5 MINUTES ▼] — 941

☑ IP ADDRESS: [1.2.3.4] — 942

☑ INSTALLATION LOCATION: [OFFICE ROOM 1] — 943

☑ SHEET SIZE INITIAL VALUE: [A4 ▼] — 944

☐ CASSETTE MARGIN ADJUSTMENT: [15] — 1602

946 — [OK]   [CANCEL] — 947

SYSTEM, MANAGEMENT DEVICE, INFORMATION PROCESSING DEVICE, CONTROL METHOD FOR MANAGEMENT DEVICE, CONTROL METHOD FOR INFORMATION PROCESSING DEVICE, AND COMPUTER-READABLE STORAGE MEDIUM

BACKGROUND

Field

The present disclosure relates to a system, a management device, an information processing device, a control method for a management device, a control method for an information processing device, and a computer-readable storage medium.

Description of the Related Art

Generally, newly installing a device such as a multi-functional peripheral, the multi-function peripheral being an information processing device, into a client environment may require initial installation work based on the specific client environment.

Such initial installation work for adding a device may take significant time and labor. In order to reduce the amount of needed time and labor, installation data (including firmware, setting information and work instructions describing a procedure to be applied to a target device which is being installed) may be prepared before performing the same initial installation work for a plurality of devices. An initial installation system has been proposed in which each of the devices being added to a client environment, performs processing based on the prepared work instructions automatically so that an operator can implement the initial installation work more efficiently.

In such systems, setting information to be set in a target device may not only be is generated by an operator in performing an initial installation process but may often also be generated on the basis of a setting information file acquired from a reference device already installed in a client environment.

When the setting information file acquired from a reference device is applied to a target device, the target device being an information processing device that needs to be initially installed, the target device may perform control such that setting information pieces from the reference device are reflected in the target device, in accordance with an import level determined on the basis of the model or serial number of the target device (see Japanese Patent Laid-Open No. 2012-226662). In this manner, the target device can safely take over the setting information of the reference device.

However, the setting information to be set in the initial installation work may in some circumstances include a setting item dependent on the model or serial number of the target device. For example, such a setting item may be a device installation location, a device name or any other network setting, for example. According to the technology disclosed in Japanese Patent Laid-Open No. 2012-226662, it is difficult for an initial installation process such as that discussed above for an information processing device, to incorporate setting a specific item that needs to be set individually. Because of that, after setting processing applying the setting information file acquired from a management device is completed, an operator may be required to check and manually correct the settings in a target device, which may prevent efficient implementation of initial installation work.

SUMMARY

Various embodiments of the present disclosure provide a mechanism by which an information processing device can complete initialization processing including setting a specific item by the be set by the information processing device in accordance with an instruction describing an automatic setting procedure.

An automatic installation system according to various embodiments includes the following configuration.

The automatic installation system includes a management device and a target information processing device, the management device and the target information processing device being communicably connected. The management device has an editing unit configured to acquire a setting information file set in a reference information processing device and to edit a specific designatable item in the setting information file set by the reference information processing device, a generation unit configured to generate an instruction describing an automatic setting procedure to be executed by the target information processing device, from the setting information file edited by the editing unit, a response unit configured to respond to an acquisition request received from the target information processing device by transmitting a setting information file identified by the acquisition request, the acquisition request sent by the target information processing device in response to execution of the automatic setting procedure instruction by the target information processing device. In addition, the target information processing device has an execution unit configured to analyze the automatic setting procedure instruction acquired from the management device and execute an automatic installation processing, an acquisition unit configured to acquire from the management device, the setting information file identified by the automatic setting procedure instruction analyzed by the execution unit, a detection unit configured to detect a specific item from the setting information file acquired by the acquisition unit, a setting unit configured to individually set device information managed by the target information processing device corresponding to the specific item detected by the detection unit, and a notifying unit configured to notify the management device after the execution unit completes the automatic installation processing. The execution unit uses the device information set by the setting unit to execute the automatic installation processing based on the setting information file.

Further features will become apparent from the following description of exemplary embodiments with reference to the attached drawings.

BRIEF DESCRIPTION OF THE DRAWINGS

FIGS. 4A to 4D illustrate a software configuration example of an information processing device according to one embodiment.

FIGS. 5A and. 5B illustrate example tables to be managed according to one embodiment.

FIGS. 6A to 6E illustrate example tables to be managed by an installation data management device according to one embodiment.

FIGS. 7A to 7C illustrate processing of installed firmware according to one embodiment.

FIGS. 8A and 8B illustrate a setting information file (script) according to one embodiment.

FIGS. 9A to 9C illustrate user interface screen examples provided by a user interface control unit according to one embodiment.

FIGS. 13A and 13B illustrate installation data generation processing in a management device according to one embodiment.

FIGS. 15A to 15D illustrate setting data management processing in a management device according to one embodiment.

FIGS. 16A and 16B illustrate an edit screen to be displayed by a management device according to one embodiment.

DESCRIPTION OF THE EMBODIMENTS

Figure 1:
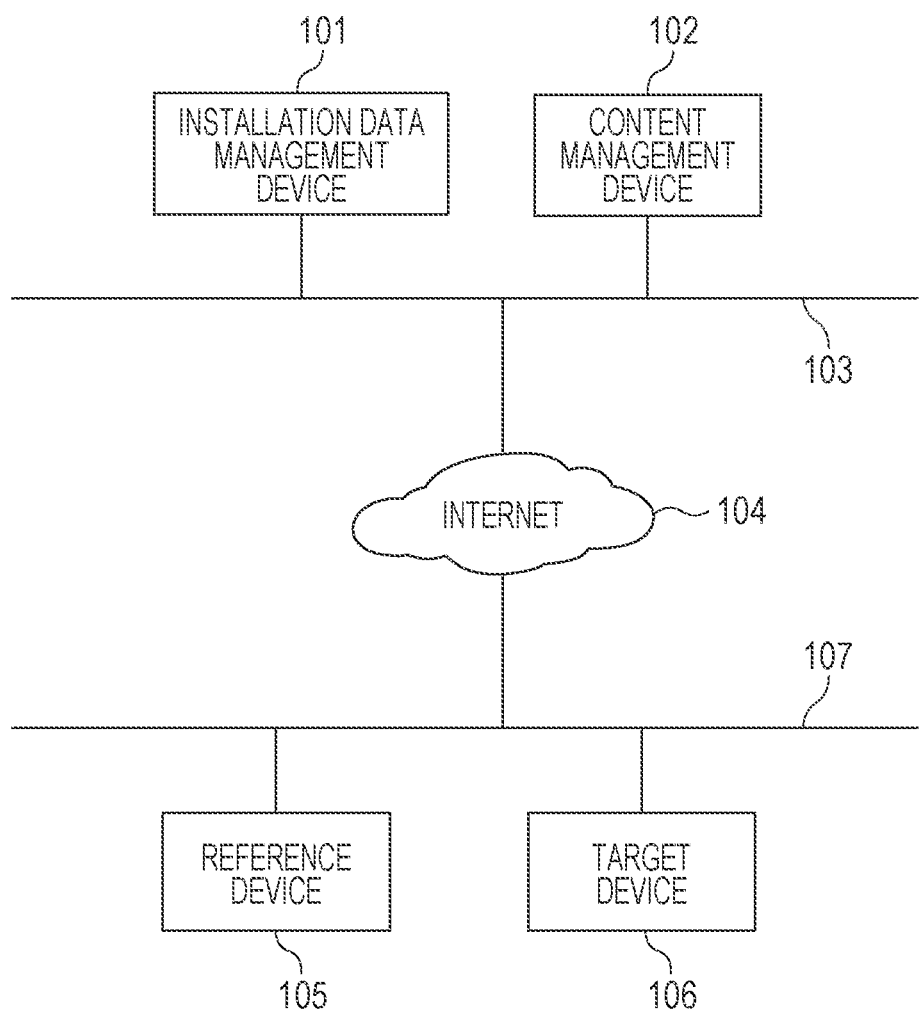
FIG. 1 illustrates a configuration of an automatic installation system according to one embodiment.

Various embodiments will be described with reference to drawings provided with this disclosure.
Description of System Configuration
First Embodiment FIG. 1 illustrates a configuration of an automatic installation system according to a first embodiment. This system is an example of an automatic installation system in which a management device and an information processing device are communicably connected.

FIG. 1 includes an installation data management device 101. An operator may generate and manage installation data including setting information on the installation data management device 101. According to this embodiment, a combination of a "setting item" and a "set value" will be called a "setting information piece". A content management device 102 of the automatic installation system is configured to manage content such as a firmware program. According to this embodiment, the installation data management device 101 and the content management device 102 are provided in separate devices. However, in other embodiments, they may be provided within one management device. A LAN 103 is connected to the installation data management device 101 and the content management device 102 in FIG. 1.

FIG. 1 further illustrates a reference device 105. The reference device 105 is an information processing device and is a device in which an initial installation process has been completed. FIG. 1 further illustrates a target device 106 that is an information processing device. The target device 106 is a device in which initial installation processing is to be performed. This embodiment assumes that the devices 105 and 106 can be, but are not limited to being, multi-functional peripherals, where a multi-function peripheral is an information processing device having a printing function, a scanner function, and a network communication function, for example. These devices 105 and 106 are located in a LAN 107, and are connected to other networks through the LAN 107. The LAN 103 and the LAN 107 are both connected to the Internet 104 and through Internet 104 they can communicate with each other.

According to the embodiment illustrated in FIG. 1, the installation data management device 101 and the content management device 102 are connected to the Internet 104 through the LAN 103. However, devices 101 and 103 may be directly connected to the Internet 104 in other embodiments. Also, the reference device 105 and the target device 106 may also be directly connected to the Internet 104 in other embodiments.

Figure 2A:
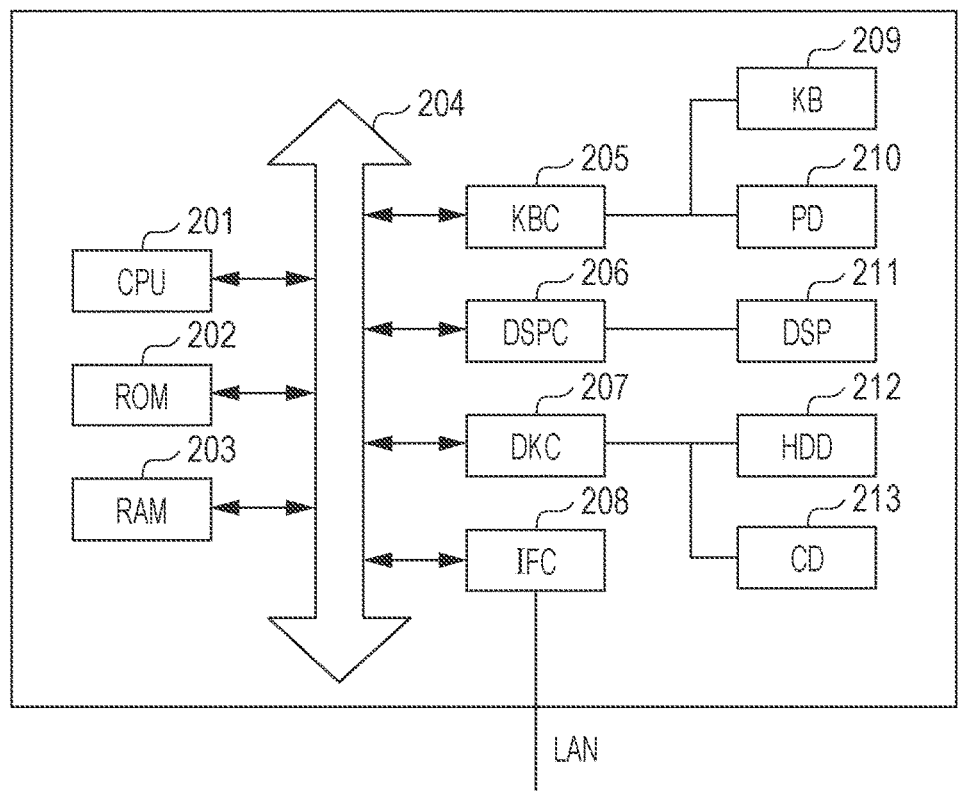
FIGS. 2A and 2B are block diagrams illustrating a hardware configuration of the automatic installation system according to one embodiment.
Figure 2B:
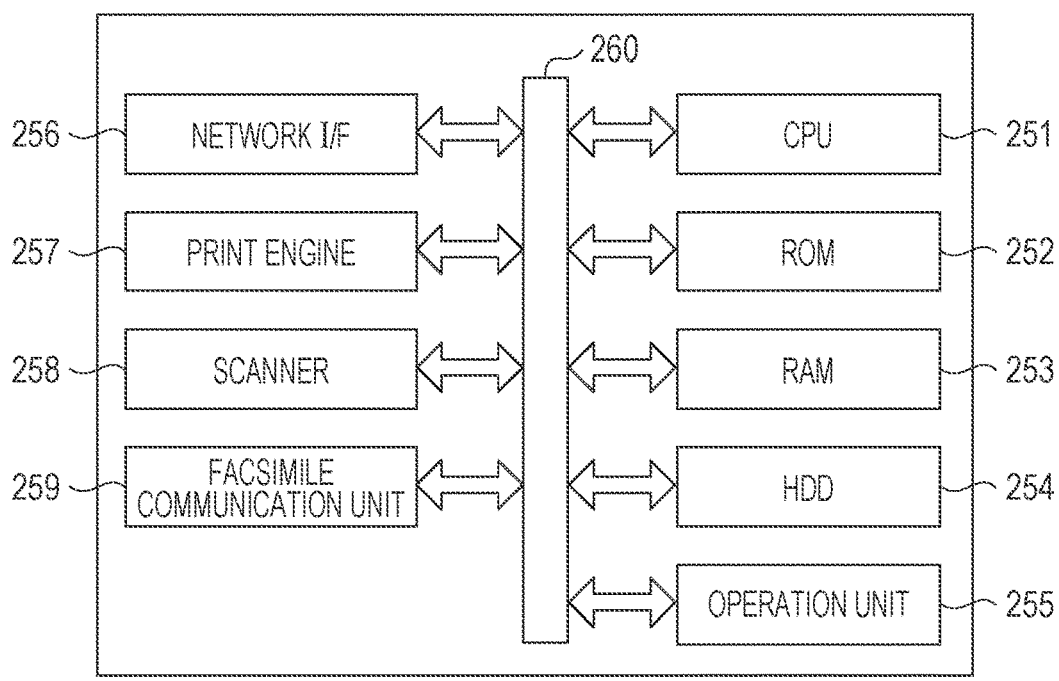

FIGS. 2A and 2B are block diagrams illustrating hardware configurations of the automatic installation system illustrated in FIG. 1. FIG. 2A illustrates a hardware configuration of an information processing device in which programs are stored which when executed cause functionality of the installation data management device 101 and the content management device 102 to be performed.

Referring to FIG. 2A, a hard disk drive (HDD) 212 stores programs including an installation data management program and a content management program according to this embodiment, which are operating subjects in the following description. A CPU 201 is an entity in hardware which executes software unless otherwise specified in the following description. On the other hand, a subject of control in software is the installation data management program and the content management program stored in the hard disk drive (HDD) 212.

A ROM 202 stores a BIOS and a boot program. A RAM 203 auctions as a main memory and a work area for the CPU 201. A keyboard controller (KBC) 205 controls a designation input from a keyboard (KB) 209 or a pointing device (PD) 210, for example. A display controller (DSPC) 206 is configured to control display of a display (DSP) 211.

A disk controller (DKC) 207 is configured to control an access to a storage device such as the hard disk drive (HDD) 212 and a CD-ROM (CD) 213. The hard disk drive (HDD) 212 and the CD-ROM (CD) 213, for example, may store a boot program, an operating system, a database, an installation data management program, a content management program, and data therefor. An interface controller (IFC) 208 is configured to exchange information with another network device through the LAN. These components are provided on the system bus 204.

The installation data management program and the content management program according to this embodiment may be supplied in a storage medium such as a CD-ROM. In this case, such a program may be read from the storage medium by the CD-ROM (CD) 213 illustrated in FIG. 2A and is installed in the hard disk drive (HDD) 212.

FIG. 2B illustrates an internal configuration example of the reference device 105 and the target device 106 that are information processing devices.

Referring to FIG. 2B, a CPU 251 is configured to generally control the multi-functional peripheral, and a ROM 252 is configured to store a serial number being a device information piece to be set individually. A RAM 253 is usable as a work area and a reception buffer for the CPU 251 and is usable for image drawing by the CPU 251. A hard disk drive (HDD) 254 is configured to record firmware, an extension program, and font data. Here, the device information may include a device name and a device number.

An operation unit 255 includes switches, buttons, and a liquid crystal display unit for message display. A network interface (I/F) 256 is usable for connection to the network and is configured to exchange information with another network device through the LAN. A print engine 257 is configured to perform printing on printing sheet. A scanner 258 is configured to scan a document. A facsimile communication unit 259 is configured for facsimile transmission and reception. These components are arranged on a system bus 260.

Figure 3A:
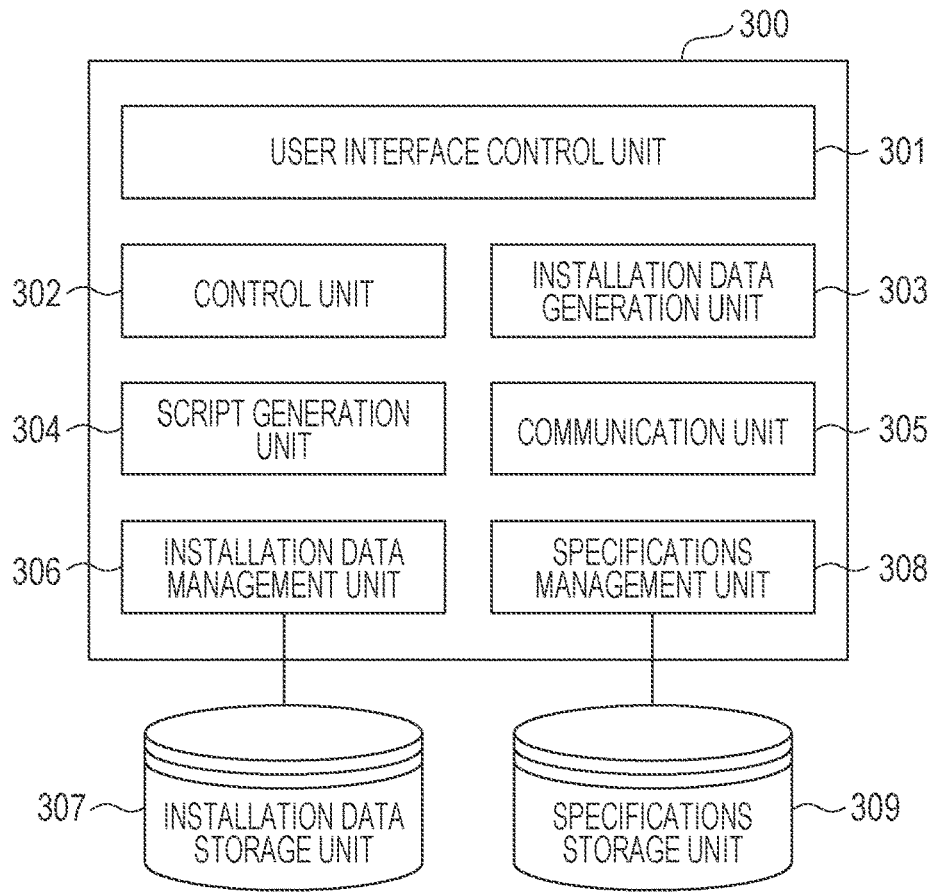
FIGS. 3A and 3B are block diagrams illustrating a software configuration of a management device according to one embodiment.
Figure 3B:
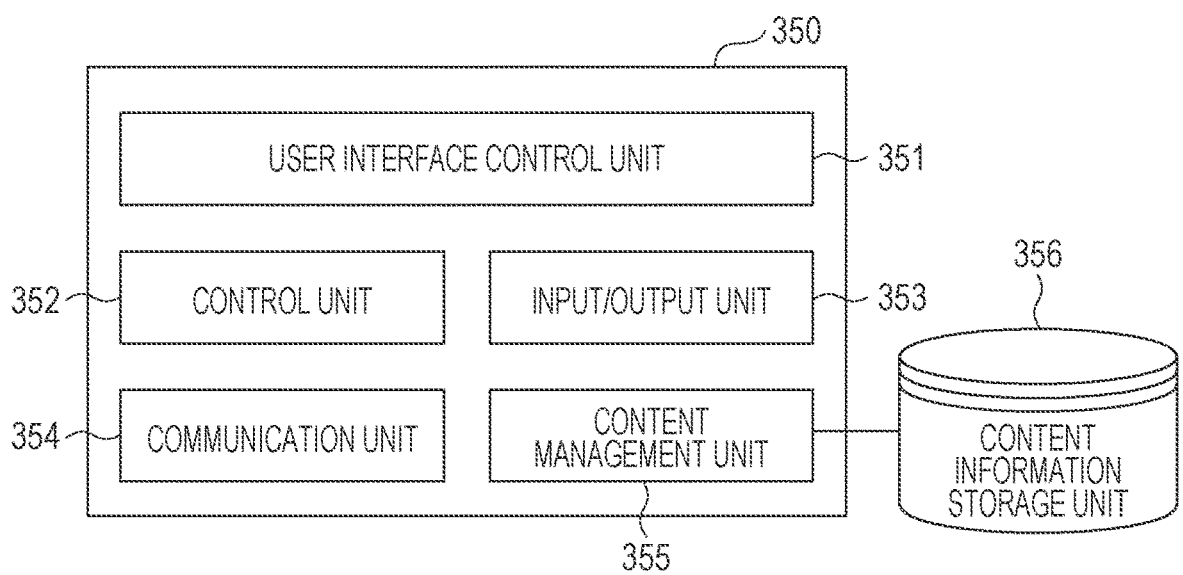

FIGS. 3A and 3B are block diagrams illustrating software configurations of the management device according to this embodiment. Particularly, FIG. 3A illustrates a functional configuration example of an installation data management program 300 running on the installation data management device 101 illustrated in FIG. 1. The program may be executed by the CPU 201 to implement functions.

Referring to FIG. 3A, a user interface control unit 301 provides a graphical user interface by which an operator can operate the program. The graphical user interface is configured as a Web page displayable by another PC by using HTTP (HyperText Transfer Protocol). Alternatively, the graphical user interface may be configured to be displayable on the display 211 included in the installation data management device 101. A control unit 302 is configured to designate a process to a function within the installation data management program 300 in accordance with an instruction from the user interface control unit 301 or a request received by a communication unit 305. An installation data generation unit 303 is configured to generate installation data including setting information in accordance with an instruction from the control unit 302 on the basis of input information from the user interface control unit 301.

Figure 4B:
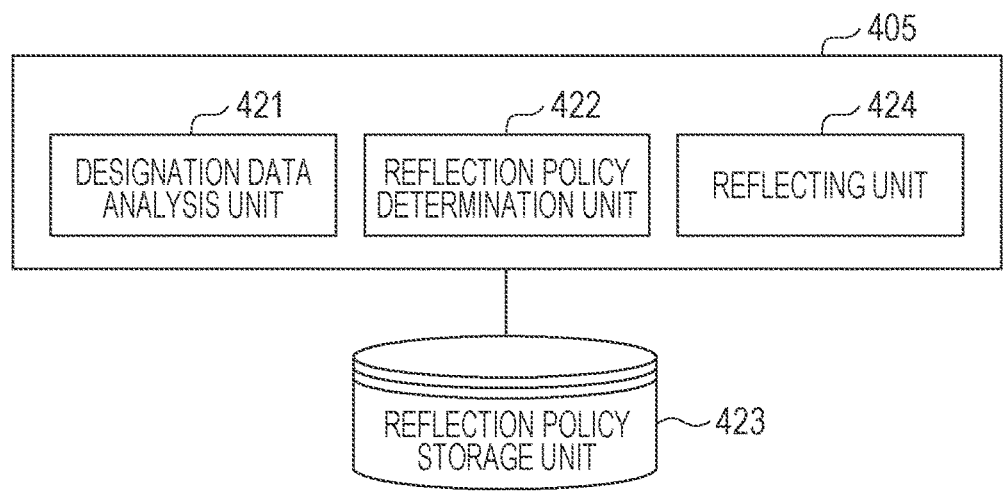
Figure 4C:
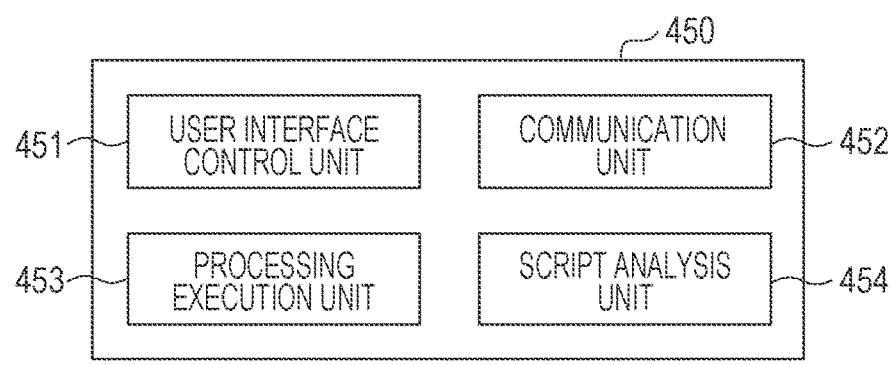

A script generation unit 304 is configured to generate a script for an installation process, which can be analyzed by an automatic installation program 450 illustrated in FIG. 4C, on the basis of installation data generated by the installation data generation unit 303 in accordance with an instruction from the control unit 302. Here, the script is an instruction describing an automatic setting procedure and is acquired from the information processing device. The automatic installation program 450 analyzes the instruction and executes initial setting processing.

The communication unit 305 is configured to receive a request from the target device 106 and transmit data of the request to the control unit 302. The communication unit 305 is further configured to receive a processing result in response to a request from the control unit 302, generate response data to the request, and transmit the response to the request source. The communication unit 305 is responsible for HTTP communication and is configured to transmit a Web page received from the user interface control unit 301 to another PC as required.

An installation data management unit 306 is configured so instruct installation data storage, deletion, update, and acquisition processes to an installation data storage unit 307 in accordance with instructions from the control unit 302. The installation data storage unit 307 is a database configured to hold installation data. A specifications management unit 308 is configured to instruct specifications information storage, deletion, update, or acquisition processes, which will be described below, to a specifications storage unit 309 in accordance with instructions from the control unit 302. The specifications storage unit 309 is a database configured to hold specifications information of a device.

FIG. 3B illustrates a functional configuration example of a content management program 350 running on the content management device 102 illustrated in FIG. 1. Functions, which will be described below, are implemented by execution of the program by the CPU 201.

Referring to FIG. 3B, a user interface control unit 351 provides a graphical user interface by which an operator can operate the program. The graphical user interface may be configured as a Web page displayable by another PC by using HTTP (HyperText Transfer Protocol). Alternatively, the graphical user interface may be configured to be displayable on the display 211 provided in the content management device 102. A control unit 352 instructs a process to the corresponding function within the content management program 350 in accordance with an instruction from the user interface control unit 351 or a request received by a communication unit 354. An input/output unit 353 is configured to receive input/output of a content in accordance with an instruction from the control unit 302.

The communication unit 354 is configured to receive a request from the target device 106 and transmit requested data to the control unit 352. The communication unit 354 is further configured to receive a processing result to a request from the control unit 352, generate response data to the request, and transmit the response to the request source. The communication unit 354 is responsible for HTTP communication and is configured to transmit a Web page received from the user interface control unit 351 to another PC as required.

A content management unit 355 is configured to instruct content storage, deletion, update, and acquisition processes to a content information storage unit 356 in accordance with instructions from the control unit 352. A content information storage unit 356 is a database running on the content management device 102.

Functions of the installation data management device 101 and the content management device 102 are implemented by execution by the CPU 201 of the program relating to the installation data management device 101 and the content management device 102. Details of data managed in the installation data storage unit 307, the specifications storage unit 309 and the content information storage unit 356 will be described with reference to FIGS. 6A to 6E and FIGS. 7A to 7C.

FIGS. 4A to 4D illustrate software configuration examples of the information processing device according to this embodiment.

In multi-functional peripheral software 400 in a multi-functional peripheral illustrated in FIG. 4A, native programs 401 being control programs originally provided for a printer, a FAX, and a scanner run on an operating system (OS) 410. An extension program execution platform 402 being an extension program execution platform also runs thereon. A firmware update service 403, a function activation service 404, and a setting management service 405 run on the native programs 401. An extension program system service 406 and extension programs 407 run on the extension program execution platform 402.

The firmware update service 403 is a service providing a function for updating firmware. For example, with reference to a firmware program designated from an operator, the firmware update service 403 determines whether update of the firmware program in the device is required or not. The firmware program is updated through the corresponding one of the native programs 401.

The function activation service 404 is a service for activating a function incorporated in advance in the native programs 401. The function activation service 404 identifies and activates a function identified from a function license file designated from an operator.

The setting management service 405 is a service for managing setting information for a printer, scanner, or the like. The setting management service 405 has a user interface whereby an operator can instruct a setting change through the operation unit 255 in the multi-functional peripheral. The setting management service 405 provides a function of changing setting information for the native programs 401 when a setting information file in a format, which will be described below, is designated by an operator. The setting management service 405 is configured to organize setting information in a data file and provides it as a setting information file in response to a request from one of the extension programs 407. A request from one of the extension programs 407 to the setting management service 405 is executed through the extension program system service 406.

The extension program system service 406 is a utility library commonly usable for extension programs and is provided by the system. A function of the extension program system service 406 may be invoked from one of the extension programs 407 so that time and labor for developing an extension program can be saved.

The extension programs 407 are capable of accessing modules of the multi-functional peripheral such as other extension programs 407 only through the extension program execution platform 402 or the extension program system service 406. The extension programs 407 each having a user interface is capable of displaying an icon on a main menu screen displayed on the operation unit 255 of the multi-functional peripheral. When the icon is selected by an operator, the operation unit 255 transmits the fact to the CPU 251. After that, the CPU 251 displays a user interface of ah extension program selected by an operator on the operation unit 255.

Having described the fundamental part of the software configuration only, the software configuration may include other services in some execution environments. Unnecessary services may be excluded for a variety of reasons such as limited settings.

FIG. 4B is a functional configuration example of the setting management service 405 illustrated in FIG. 4A. Referring to FIG. 4B, a designation data analysis unit 421 is configured to analyze a setting information file received by the setting management service 405. More specifically, a serial number, a model name, and setting information that are information by which a device included in a setting information file can be uniquely identified are extracted and are temporarily held in the RAM 253 or the HDD 254.

A reflection policy determination unit 422 is configured to determine whether setting information in a setting information file can be reflected to the multi-functional peripheral or not by using the serial number and model name in the setting information file extracted by the designation data analysis unit 421 and the serial number and model name of the multi-functional peripheral itself.

A reflection policy storage unit 423 is configured to manage an acquisition condition table 500 and setting specifications management table 510 illustrated in FIGS. 5A and 5B. FIG. 4B further illustrates a reflecting unit 424. Setting information determined by the reflection policy determination unit 422 to reflect is written in the corresponding native program 401.

FIG. 4C illustrates a functional configuration example of an automatic installation program running on the multi-functional peripheral. According to this embodiment, the automatic installation program 450 is installed as one of the extension programs 407 in the multi-functional peripheral or may be installed as one of the native programs 401, for example. The automatic installation program 450 analyzes an instruction acquired from the installation data management device 101 and executes the automatic installation processing.

Referring to FIG. 4C, the CPU 251 executes a program corresponding to a function so that the function can be implemented. A user interface control unit 451 provides a user interface for operating the automatic installation program 450 to an operator through the operation unit 255 and receives an operation performed by the operator.

The communication unit 452 acquires data from the installation data management device 101 and the content management device 102 through the extension program system service 406 and the network I/F 256. The acquired data include installation data and contents applicable to the multi-functional peripheral. Also, the communication unit 452 transmits data to the installation data management device 101 and the content management device 102. In accordance with instructions from the user interface control unit 451 and a script analysis unit 454, a processing execution unit 453 performs the corresponding processes. The script analysis unit 454 analyzes a script included in installation data acquired by the communication unit 452 and determines processes to be executed by the processing execution unit 453 and the order in which the processes are to be executed.

Figure 4D:
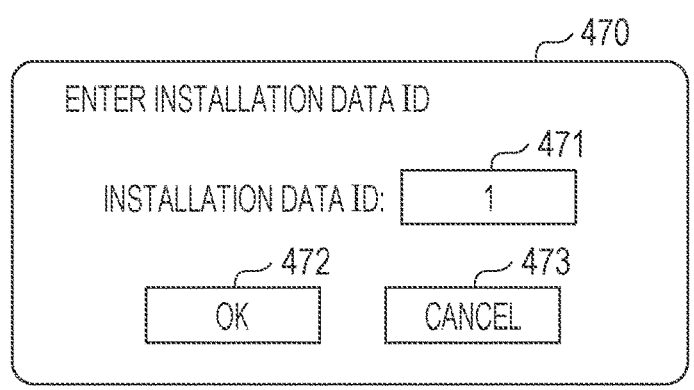

FIG. 4D illustrates a user interface screen example of the user interface control unit 451 in the automatic installation program 450.

Referring to FIG. 4D, a user interface screen 470 is a screen to be displayed after an operator activates the automatic installation program 450 on the device and authentication processing is executed as required.

The user interface screen 470 has an input area 471 for installation data ID, which will be described below. The value in the installation data ID input area 471 is usable in the installation data management device 101 for uniquely identifying installation data to be applied to the device.

The user interface screen 470 further has an OK button 472. In response to a press on the OK button 472, the automatic installation program 450 transmits the value in the installation data ID input area 471 to the installation data management device 101. This operation will be described in detail with reference to FIG. 12. The user interface screen 470 further has a cancel button 473. In response to a press on the cancel button 473, the user interface screen 470 is closed.

FIGS. 5A and 5B illustrate table examples managed by the reflection policy storage unit 423 illustrated in FIGS. 4A to 4D. FIGS. 5A and 5B illustrate table configuration examples, but various embodiments of the present disclosure can have other table configurations different from the examples illustrated in FIGS. 5A and 5B.

FIG. 5A illustrates an acquisition condition table 500 having columns 501 and 502. The column 501 provides condition IDs that are identifiers by which the conditions 502 can be uniquely identified.

The column 502 provides conditions under which the reflection policy determination unit 422 can determine whether setting information is to be acquired or not. Here, conditions "serial number matched", "model name matched", and "no condition" are illustrated, but other conditions may be provided.

FIG. 5B illustrates a setting specifications management table 510 having columns 511 to 517. In this example, one record corresponds to one setting information piece.

Referring to FIG. 5B, the column 511 provides setting item IDs which are identifiers by which setting items for the device can be uniquely identified.

The column 512 provides setting item names which are names usable for displaying the setting items on the operation unit 255. The column 513 provides types which are data types of setting items.

The column 514 provides value ranges which are ranges of possible values of setting items. For example, when the column 513 provides an enumeration type, the column 514 has a value range storing discrete numeral values or predefined constants. When the column 513 provides a character string type, the column 514 has a value range storing a character string length.

The column 515 provides value display names each storing a name to be displayed on the operation unit 255 for each enumerated value when the column 514 has a value range of the enumeration type. For example, the first record stores "1", "5", and "10" as the value range in the column 514 which are displayed as display names "1 (MIN.)", "5 (MIN.)", "10 (MIN.)", respectively. The column 516 provides initial values which are initial values of setting items. The column 517 provides condition IDs storing acquisition conditions for setting items. The values to be stored therein are values of records in the corresponding conditions ID 501 on the acquisition condition table 500.

In a case where the setting information is reflected to the multi-functional peripheral, the reflection policy determination unit 422 acquires conditions corresponding to the values of the conditions ID 517 from the conditions 502 on the acquisition condition table 500 and determines whether the corresponding setting information pieces are to be reflected or not.

FIGS. 6A to 6B illustrate table examples managed by the installation data management device 101 illustrated in FIG. 1. FIGS. 6A and 6B illustrate table examples managed by the installation data storage unit 307. FIGS. 6A to 6E illustrate table configuration examples, but other table configurations different from the examples may be applied.

FIG. 6A illustrates an installation data management table 600 having columns 601 to 607. This table stores general installation data. One record corresponds to one installation data piece.

Referring to FIG. 6A, a column 601 provides installation data IDs. Each of the installation data IDs is an identifier given to an installation data piece when the installation data piece is generated by the installation data management program 300 and is a unique value with respect to all installation data pieces. A simple value "1" is applied according to this embodiment for easy understanding, a GUID (Global Unique Identifier) may be used, for example.

The column 602 provides installation data names which are names of installation data pieces. The column 603 provides model names which are model names of devices applying installation data pieces. The column 604 provides firmware versions which are versions of firmware programs to be applied in devices. The column 605 provides setting information IDs which are identifiers by which a setting information piece, which will be described below, can be uniquely identified.

According to this embodiment, one installation data piece is configured to include one model only. Therefore, in a case where a plurality of models of devices is installed in a client environment, an operator generates a plurality of installation data pieces for each model.

The column 606 provides scripts storing scripts generated by the installation data management device 101. Though this embodiment assumes that the entity of a script is stored in the column 606, the column 606 may store paths to entities of scripts. In this case, such an entity of a script is placed as a file at a separate location.

The column 607 provides processing results which are results of processing by the target device 106 of scripts stored in the column 606. Each of the processing results may be converted into a file for storage therein.

FIG. 6B illustrates a setting information management table 610 having columns 611 to 617. According to this embodiment, one record corresponds to setting information for one installation data piece.

Referring to FIG. 6B, the column 611 provides setting information IDs which are identifiers each for uniquely identifying a setting information piece. The setting information IDs 605 store values of records of the column. The column 612 provides flags which are usable for determining whether the target device 106 applies all setting information pieces or not when the setting information pieces of the corresponding records are applied to the target device 106. This embodiment assumes that the flags (in the column 612) may possibly take a values of "true" or "false". However, embodiments of the present disclosure are not limited thereto. The flags may take a numeral value of "1" or "0". The columns 613 to 617 enumerate setting information examples (sleep transition time, IP address, installation location, sheet size initial value, and cassette margin adjustment). The setting information types are not limited thereto.

Having described that setting items are provided in the columns from the column 613 on the table, entities of setting information files generated in a format as illustrated in FIG. 8A, which will be described below, may be stored. An entity may not be stored therein, but a path to an entity may be stored instead. In this case, the entity may be placed as a file at a separate location.

FIGS. 6C to 6E illustrate table examples managed by the specifications storage unit 309.

FIG. 6C illustrates an acquisition condition table 620 which is identical to the acquisition condition table 500 in FIG. 5A. FIG. 6D illustrates a model identification table 630 having columns 631 to 633 (model ID, model name, and firmware version).

Referring to FIG. 6D, the column 631 provides model IDs each of which is an identifier by which a combination of a model name and a firmware version can be uniquely identified. The column 632 provides model names, and the column 633 provides firmware versions. Based on a combination of a model name (in the column 632) and a firmware version (in the column 633), an entity of a firmware program can be uniquely identified.

FIG. 6E illustrates an all setting specifications management table 650 having columns 651 to 658. According to this embodiment, one record corresponds to one setting information piece.

Referring to FIG. 6E, the column 651 provides model IDs and stores a value of a record in the corresponding model ID 631. The columns 652 to 658 are similar to the columns 511 to 517 in the setting specifications management table 510 in FIG. 5B.

According to this embodiment, the specifications management unit 308 decomposes specifications information pieces into records corresponding to setting information pieces and store them in a table format. However, entities of specifications information pieces may be stored directly. A path to an entity of a specifications information piece may only be stored. In this case, the entity of the specifications information piece may be placed as a file at a separate location.

FIGS. 7A to 7C illustrate processing of a firmware program installed in an information processing device according to this embodiment.

FIG. 7A illustrates a table example managed by the content information storage unit 356. FIG. 7A illustrates a table configuration example, but other table configurations different from the table configuration may be applied.

Referring to FIG. 7A, the firmware management table 700 is a table which stores information regarding firmware programs and has columns 701 to 704. One record corresponds to one firmware information piece.

The column 701 provides model names. This column provides designated models to which firmware programs registered with the firmware management table 700 can be applied.

The column 702 provides firmware versions. The column 702 stores version information of firmware programs registered with the column 703. The column 703 provides firmware programs. This column stores entities of firmware programs registered with the content management device 102.

The column 704 provides specifications information pieces. This column stores entities of specifications information piece registered with the content management device 102.

The specifications information is a file which manages specifications of all setting items included in a firmware program and holds the setting specifications management table 510 in FIG. 5B in the file.

This embodiment assumes entities of firmware programs and specifications information pieces are stored in the column 703 and the column 704, but each of the columns may store paths to the entities only. In this case, the entities are placed as files at separate locations.

FIGS. 7B and 7C illustrate user interface screen examples of the user interface control unit 351 in the content management program 350.

Referring to FIG. 7B, the firmware list screen 720 shows model names 721 and firmware versions 722. The model names 721 and firmware versions 722 display values of the column 701 and column 702, respective on the firmware management table 700.

The firmware list screen 720 further displays an add button 723. All operator may press the button to display an add screen 740. The firmware list screen 720 further displays a delete button 724. An operator may select an arbitrary row in a firmware list and press the delete button 724 to delete data of the corresponding record on the firmware management table 700. The firmware list screen 720 further displays an end button 725. In response to a press on the end button 725, the user interface control unit 351 can exit the firmware list screen 720.

Referring to FIG. 7C, the add screen 740 displays a firmware file designation area 741. An operator may input in the area a file path to an entity of a firmware program to be added to the content management device 102.

For easy input, a file reference dialog display button (not illustrated), for example, may be provided. This embodiment assumes a configuration in which a firmware program designated in the firmware file designation area 741 is included in the specifications information, but the firmware program and the specifications information may be provided separately. In this case, an area for inputting a file path to the specifications information may be provided on the add screen 740.

The firmware list screen 720 further displays an OK button 742. In response to a press on the OK button 742, the content management program 350 adds the firmware program designated in the firmware file designation area 741 to the firmware management table 700. In this case, from attribute information regarding the firmware program, the model name and firmware version of the firmware program are identified and are set in the columns 701 and 702. Furthermore, the firmware program is registered with the column 703, and specifications information included in the firmware program is extracted and is registered with the column 704. After that, the add screen 740 is closed.

The firmware list screen 720 further displays a cancel button 743. In response to a press on the cancel button 743, an editing result on the add screen 740 is abandoned, and the add screen 740 is closed.

FIG. 8A illustrates a setting information file (script) for setting an information processing device according to this embodiment. A setting information file 800 according to this embodiment is described in an XML format, for example.

Referring to FIG. 8A, the setting information file 800 has a control information area 801 describing a model name (<Model> tag), a firmware version (<FWV> tag), and a serial number (<SN> tag), for example. The setting information file 800 has a setting information area 802 in which setting information pieces set in the device are enumerated. According to this embodiment, tag names in the setting information are provided so as to be identical to the values of the setting item IDs 511 and 652. According to this embodiment, a data file is provided in an XML (Extensible Markup Language) format. However, a data file may be provided in a JSON (Java (registered trademark) Script Object Notation) format.

FIG. 8B illustrates a script example describing an installation procedure for automatically executing an installation process for the target device 106.

Referring to FIG. 8B, a script 820 is acquired by the communication unit 452 in the automatic installation program 450 and is analyzed by the script analysis unit 454 through the processing execution unit 453.

The script 820 analyzed by the script analysis unit 454 is then executed by the processing execution unit 453 to perform the processing described therein. The script 820 is described in an XML format and includes an installation data identification part 821, a model identification part 822, and a process description part 830.

According to this embodiment, a script is provided in an XML format. However, without limiting thereto, scripts may be shell scripts.

The installation data identification part 821 describes an installation data ID which includes a <setupID> tag by which an installation data piece can be identified. The installation data ID is identical to the value of the installation data ID (column 601) in the installation data management table 600. The model identification part 822 includes a <Model> tag describing a model name by which the model of the target device 106 to be installed can be identified. The model name is the value of the model name (column 603) in the installation data management table 600.

The process description part 830 describes a set of processes required for the installation processing. The process description part 830 includes a firmware update process part 831, a setting information process part 832, and a reboot process part 833. The tags representing the processes include order attributes. Each of the order attributes designates a sequence number of the corresponding process.

The firmware update process part 831 describes a process for updating the firmware program through the firmware update service 403. This processing part has a <updateFirmwareCommand> tag which defines a process and a <path> tag which designates a path to a server in which the entity of the firmware program exists. Furthermore, a <firmwareVersion> to designates a version of the firmware program.

The setting information process part 832 describes a process for changing setting information for the device through the setting management service 405. This process part has a <deviceConfigCommand> tag which defines a process and a <confFileId> tag which designates a value of the setting information ID 605 in a setting information file to be applied to the target device 106.

The reboot process part 833 includes a <rebootCommand> tag only which describes a process for rebooting the device after a series of installation processing steps are performed and reflecting the setting information to the device.

The descriptions of the script do not limit the processing required for the installation of the device, and processes may overlap or the number of processes may be increased or decreased as required.

FIGS. 9A to 9C illustrate user interface screen examples provided by the user interface control unit 301 in the installation data management program 300.

FIG. 9A illustrates a list screen 900 displaying an installation data ID 901, an installation data name 902, a model name 903, and a firmware version 904. They display the values of the column 601, column 602, column 603, and column 604, respectively, in the installation data management table 600.

The list screen 900 further displays a create button 905. When an operator presses the create button 905, an edit screen 920 is displayed. The list screen 900 displays an edit button 906. When an operator may select an arbitrary row in the installation data list (including items 901 to 904) and press the button, an edit screen 920 relating to the corresponding installation data is displayed.

The list screen 900 further displays a delete button 907. When an operator selects an arbitrary row in the installation data list and press the delete button 907, a record associated with the installation data ID is deleted from the installation data management table 600 and the setting information management table 610 in the installation data storage unit 307. The list screen 900 further displays an end button 908. In response to a press on the end button 908, the user interface control unit 301 closes the list screen 900.

FIG. 9B illustrates an edit screen 920 displaying an installation data name 921, a model name 922, and a firmware version input area 923. When both of the model name 922 and the firmware version 923 are input, items 924 to 929 are activated.

The edit screen 920 displays a create button 924. The create button 920 is enabled to be pressed when "NONE" is displayed in an area 927, which will be described below. When the create button 920 is pressed, a setting information edit screen 940 is displayed. In this case, the initial values of the setting items displayed on the setting information edit screen 940 are determined with reference to the tables in the specifications storage unit 309. Details thereof will be described below.

The edit screen 920 further has a file designation area 925. An operator may input in the area a file path to an entity of a setting information file acquired from the reference device 105. For easy input, a file reference dialog display button (not illustrated), for example, may be provided. The edit screen 920 further displays a load button 926. The load button 926 may be pressed to load a setting information file designated in the file designation area 925 and is temporarily held in the installation data storage unit 307.

The edit screen 920 further displays an area 927 indicating the availability of a setting information file. When a setting information file is loaded and is temporarily held in the installation data storage unit 307, "AVAILABLE" is displayed in the area. Otherwise, "NONE" is displayed.

The edit screen. 920 further displays an edit button 928. The edit button 928 is enabled to be pressed when "AVAILABLE" is displayed in the area 927. When an operator presses the edit button 928, the setting information edit screen 940 is displayed. In this case, the initial values of the setting items displayed on the setting information edit screen 940 are set values in the setting information file temporarily held in the installation data storage unit 307. Details thereof will be described below.

The edit screen 920 further displays a delete button 929. When the delete button 929 is pressed, the setting information file temporarily held in the installation data storage unit 307 is deleted, and "NONE" is displayed in the area 927.

The edit screen 920 further displays an OK button 930. When the OK button 930 is pressed, the installation data management program 300 generates a script that can be analyzed by the automatic installation program 450 and stores it along with an editing result in the tables in the installation data storage unit 307. These operations will be described in detail with reference to FIGS. 10A and 10B. After that, the edit screen 920 is closed. The edit screen 920 further displays a cancel button 931. When the cancel button 931 is pressed, an editing result on the edit screen 920 is abandoned, and the edit screen 920 is closed.

The setting information edit screen 940 illustrated in FIG. 9C displays a sleep transition time 941, an IP address 942, an installation location 943, a sheet size initial value 944, and a cassette margin adjustment input area 945. A check box is given before each of the setting items so that an operator can select a setting item to be applied to the target device 106. These user interface controls will be described in detail below.

The setting information edit screen 940 displays an OK button 946. When the OK button 946 is pressed, the installation data management program 300 temporarily holds an editing result in the installation data storage unit 307. After that, the setting information edit screen 940 is closed. The setting information edit screen 940 further displays a cancel button 947. When the cancel button 947 is pressed, an editing result on the setting information edit screen 940 is abandoned, and the setting information edit screen 940 is closed.

When an operator reboots the installation data management program 300 to generate installation data and register them with the installation data management device 101, the list screen 900 is displayed. On the list screen 900, when the create button 905 or the edit button 906 is pressed, the installation data management device 101 executes the processing on the flowchart in FIGS. 10A and 10B.

Figure 10A:
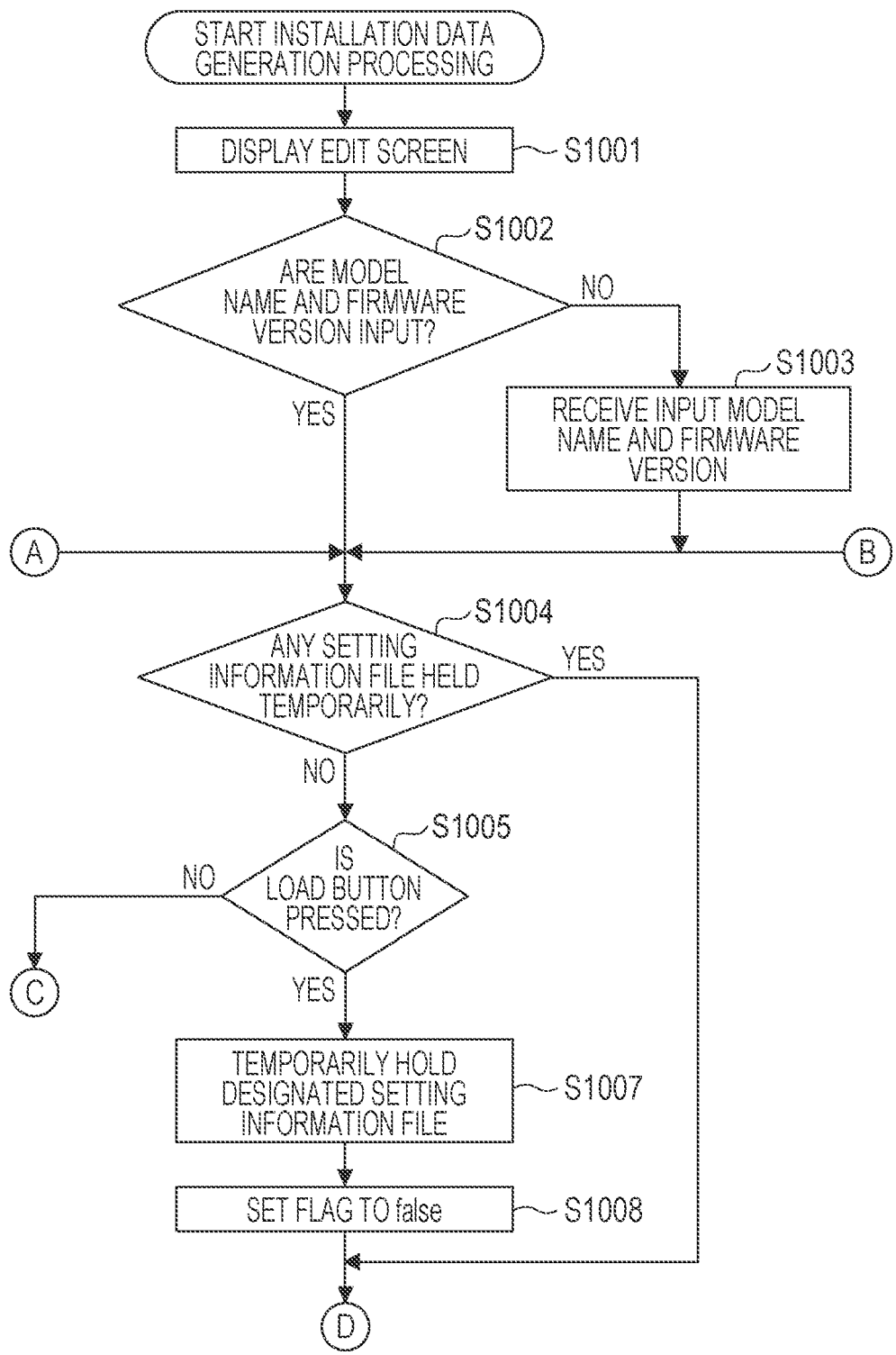
FIGS. 10A and 10B are a flowchart illustrating a control method for a management device according to one embodiment.
Figure 10B:
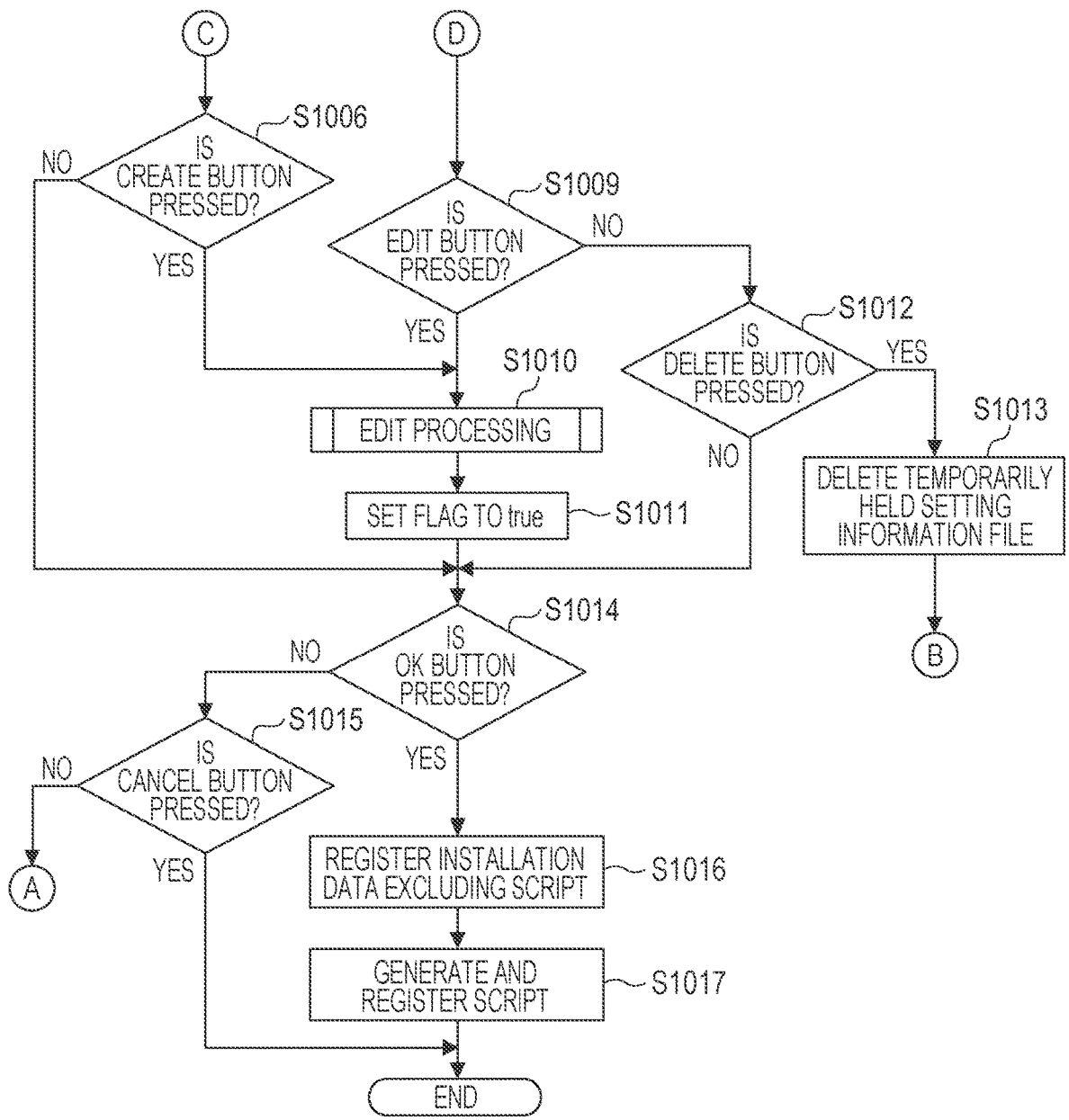

FIGS. 10A and 10B are a flowchart illustrating a control method for the management device according to this embodiment. This control method includes an installation data generation processing example to be performed by the installation data management device 101. The illustrated steps are implemented by execution of a stored control program (including the user interface control unit 301) by the CPU 201 in the installation data management device 101.

In S1001, the user interface control unit 301 displays the edit screen 920 on the DSP 211. On the list screen 900 illustrated in FIG. 9A, when the create button 905 is pressed, the initial values provided by the user interface control unit 301 are used for display.

On the other hand, when the edit button 906 is pressed, the user interface control unit 301 acquires a value of installation data to be edited from the table in FIG. 7A as an initial value. In a case when the installation data to be edited includes setting information, the installation data are loaded and are converted into a file in a format as illustrated in FIG. 8A which is then temporarily held in the installation data storage unit 307 after giving an arbitrary file name to the file.

In S1002, the user interface control unit 301 determines on the user interface screen illustrated in FIG. 9B whether values are input to the model name 922 and the firmware version 923 by an operator or not. Here, if the user interface control unit 301 determines that values are input to the model name 922 and the firmware version 923, the processing moves to S1004. On the other hand, if the user interface control unit 301 determines that no values are input to the model name 922 and the firmware version 923, the processing moves to S1003.

In S1003, the user interface control unit 301 receives values input to the model name 922 and the firmware version 923, and the processing moves to S1004.

In S1004, the user interface control unit 301 determines whether any setting information file is held temporarily or not. Here, if the user interface control unit 301 determines that some setting information file is temporarily held, the processing moves to S1009. On the other hand, if the user interface control unit 301 determines that no setting information file is held temporarily, the processing moves to S1005.

In S1005, the user interface control unit 301 determines whether a setting information file is designated in the file designation area 925 and the load button 926 is pressed or not. Here, if the user interface control unit 301 determines that the load button 926 is pressed, the processing moves to S1007. On the other hand, if the user interface control unit 301 determines that the load button 926 is not pressed, the processing moves to S1006.

In S1006, the user interface control unit 301 determines whether the create button 924 is pressed or not. Here, if the user interface control unit 301 determines that the create button 924 is pressed, the processing moves to S1010. On the other hand, if the user interface control unit 301 determines that the create button 924 is not pressed, the processing moves to S1014.

In S1007, the user interface control unit 301 temporarily holds, in the installation data storage unit 307, the setting information file designated in the file designation area 925. In this case, "AVAILABLE" is displayed as the value in the area 927, and the edit button 928 is activated. In S1008, the user interface control unit 301 temporarily holds the "false" as the flag value in the installation data storage unit 307. In S1009, the user interface control unit 301 determines whether the edit button 928 is pressed or not. Here, if the user interface control unit 301 determines that the edit button 928 is pressed, the processing moves to S1010. On the other hand, if the user interface control unit 301 determines that the edit button 928 is not pressed, the processing moves to S1012. In S1010, in response to a request from the user interface control unit 301, the installation data generation unit 303 executes processing for editing the setting information file. The processing will be described in detail with reference to FIGS. 11A and 11B.

In S1011, the user interface control unit 301 temporarily holds "true" as the flag value in the installation data storage unit 307. The flag value "true" is set so that all setting information in the setting information file can be applied to the target device 106. In S1012, the user interface control unit 301 determines whether the delete button 929 is pressed or not. Here, if the user interface control unit 301 determines that delete button 929 is pressed, the processing moves to S1013. On the other hand, if the user interface control unit 301 determines that the delete button 929 is not pressed, the processing moves to S1014.

In S1013, the user interface control unit 301 deletes the setting information file temporarily held in the installation data storage unit 307. After that, the processing returns to S1004. In S1014, the user interface control unit 301 determines whether the OK button 930 is pressed or not. Here, if the user interface control unit 301 determines that the OK button 930 is pressed, the processing moves to S1016. On the other hand, if the user interface control unit 301 determines that the OK button 930 is not pressed, the processing moves to S1015.

In S1015, the user interface control unit 301 determines whether the cancel button 931 is pressed or not. Here, if the user interface control unit 301 determines that the cancel button 931 is pressed, the user interface control unit 301 abandons the editing result on the edit screen 920 and closes the edit screen 920. On the other hand, if the user interface control unit 301 determines that the cancel button 931 is not pressed, the processing returns to S1004, and an editing work is continued on the edit screen 920.

In S1016, the installation data generation unit 303 registers the information input on the edit screen 920 by an operator with the installation data management table 600 and the setting information management table 610 through the installation data management unit 306.

In S1017, the user interface control unit 301 supplies the information input on the edit screen 920 by an operator so the script generation unit 304 to request generation of a script as illustrated in FIG. 8B. A method for generating a <deviceConfigCommand> tag in the setting information process part 832 will be described particularly below.

The script generation unit 304 acquires the flag value and setting information ID of the setting information registered in S1016. The flag value ("true" or "false") as described above is set as a flag attribute to a <deviceConfigCommand> tag. A value of the setting information ID is set to a <confFileId> tag. After that, the installation data generation unit 303 receives the script from the script generation unit 304 and registers it with the column 606. Up to this point the flowchart has been described. According to this embodiment, the flag value "true" is applied as a flag attribute so that the setting information file set in another information processing device (reference device 105) may be acquired and that the setting information file can be edited in which the information processing device (target device 106) can designate a specific item to be set.

Figure 11A:
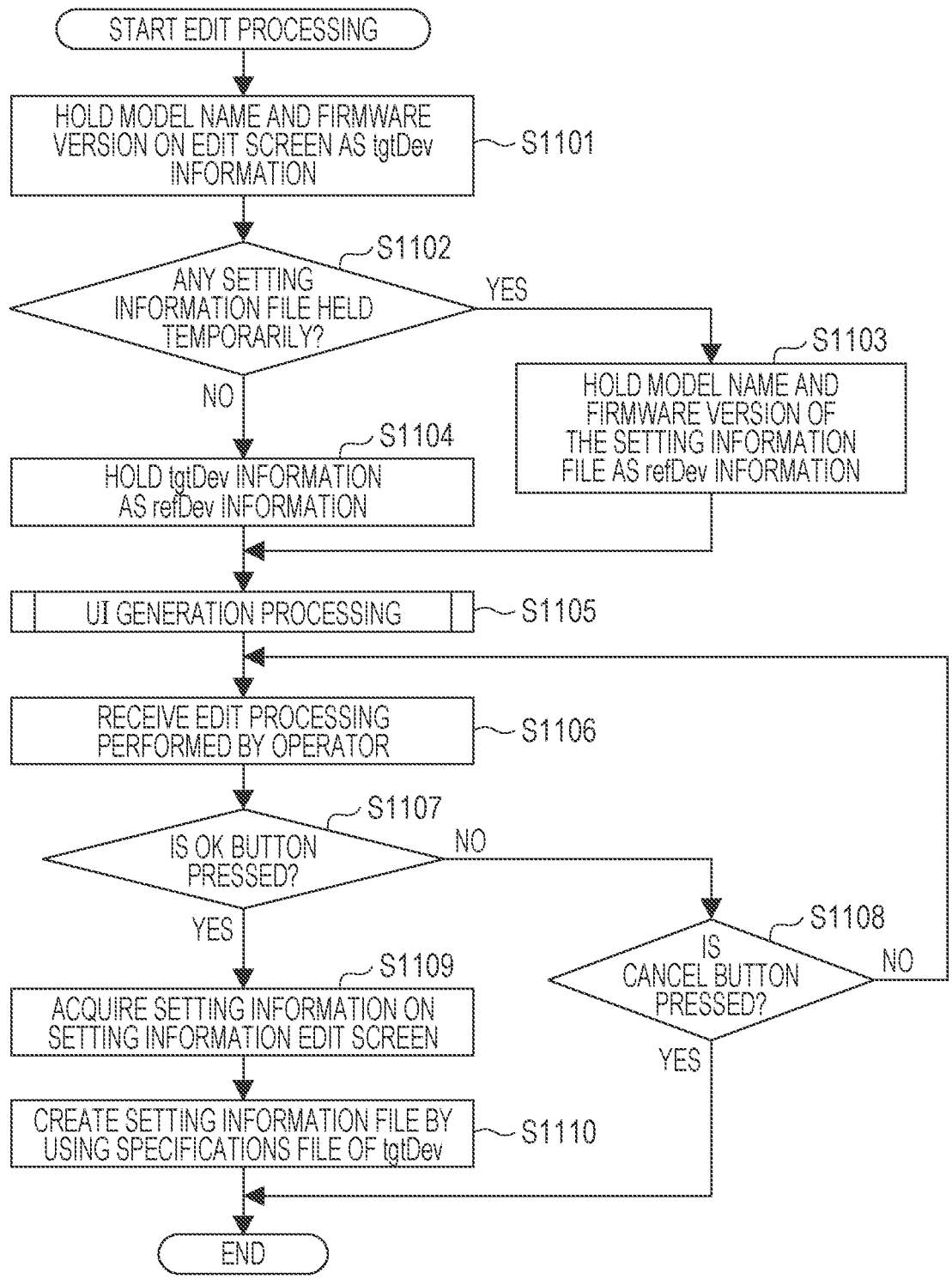
FIGS. 11A and 11B are flowcharts illustrating a control method for a management device according to one embodiment.
Figure 11B:
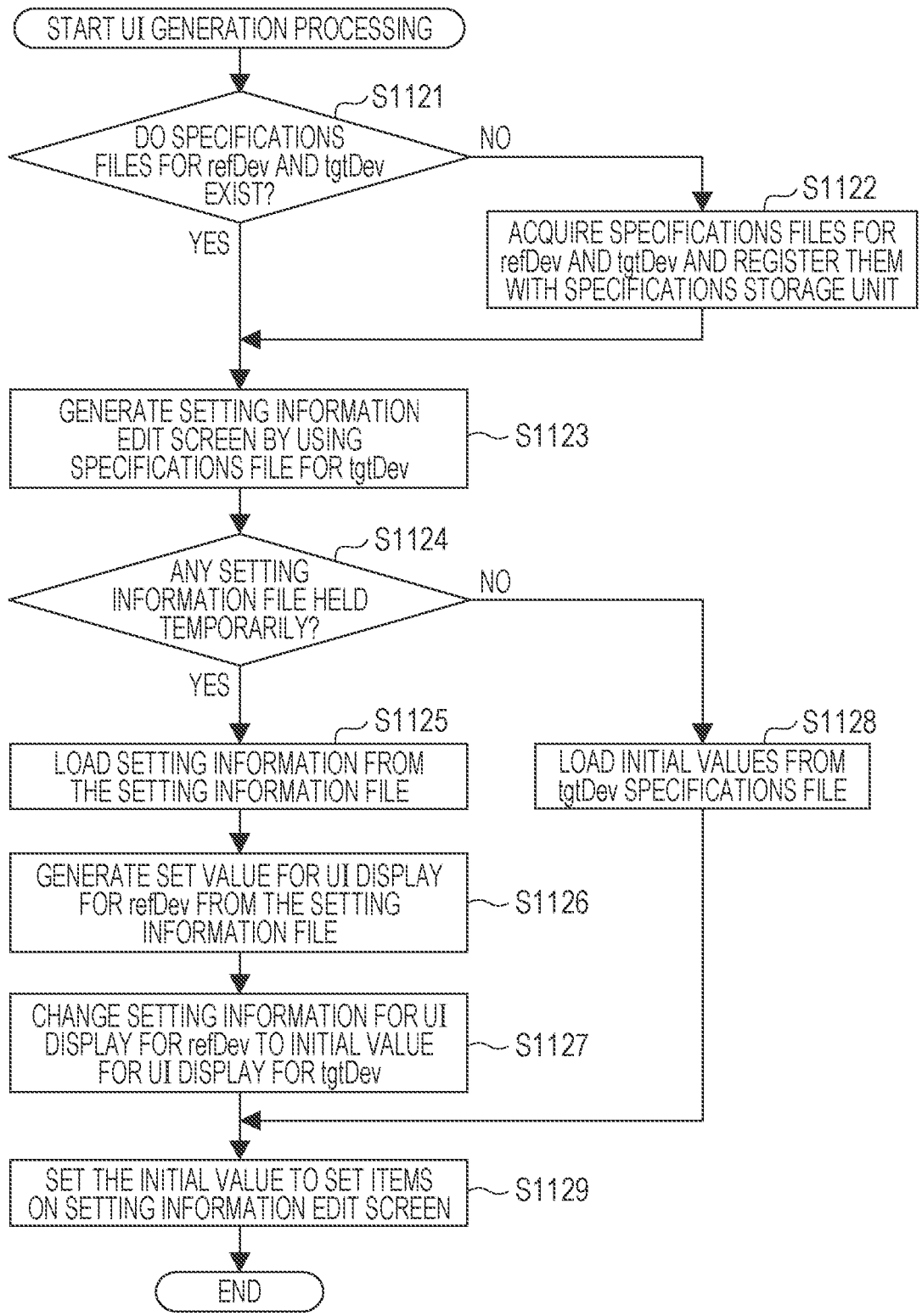

FIGS. 11A and 11B are flowcharts illustrating a control method for the management device according to this embodiment. More specifically, FIG. 11A illustrates a detailed example of the edit processing in S1010 performed by the installation data management device 101. FIG. 11B illustrates a detail example of the user interface generation processing illustrated in FIG. 11A. The steps are implemented by execution of a stored control program by a CPU. According to this embodiment, the steps are implemented by execution of a stored control program (including the user interface control unit 301 and the installation data generation unit 303) by the CPU 201 in the installation data management device 101.

Referring to FIG. 11A, in S1101, the installation data generation unit 303 temporarily holds a combination of the model name 922 and the firmware version 923 as tgtDev information in the installation data storage unit 307. In S1102, the installation data generation unit 303 determines whether any setting information file is temporarily held in the installation data storage unit 307.

In a case where S1010 in the edit processing is executed subsequently to S1006 in the flowchart in FIG. 10B, no setting information file exists. On the other hand, in a case where the step is executed subsequently to S1009, a setting information file exists. If the installation data generation unit 303 determines that some setting information file is temporarily held, the processing moves to S1103. On the other hand, if the installation data generation unit 303 determines that no setting information file is temporarily held, the processing moves to S1104.

In S1103, the installation data generation unit 303 acquires the model name and the firmware version from the setting information file and temporarily holds them as refDev information in the installation data storage unit 307. For example, from the setting information file 800, refDev information having a model name "model 1" and a firmware version "1.00" can be acquired.

In S1104, the installation data generation unit 303 also holds the tgtDev information held in S1101 as refDev information. In S1105, the installation data generation unit 303 executes the user interface generation processing. This processing will be described in detail with reference to FIG. 11B.

In S1121 illustrated in FIG. 11B, the installation data generation unit 303 determines whether the refDev information and the tgtDev information are registered with the model identification table 630 or not. Here, if the installation data generation unit 303 determines that the refDev information and the tgtDev information are registered with the model identification table 630, the processing moves to S1123. On the other hand, if the installation data generation unit 303 determines that the refDev information and the tgtDev information are not registered with the model identification table 630, the processing moves to S1122.

In S1122, the installation data generation unit 303 acquires specifications information in the refDev information and the tgtDev information from the content management device 102. More specially, the installation data generation unit 303 transmits a specifications information acquisition request to the communication unit 354 in the content management device 102 through the communication unit 305. The control unit 352 receives the request through the communication unit 354 and acquires the specifications information from the content information storage unit 356 through the content management unit 355. After that, the control unit 352 responds with the specifications information to the communication unit 305 through the communication unit 354. If the installation data generation unit 303 receives the specifications information through the communication unit 305, the installation data generation unit 303 supplies the specifications information to the specifications management unit 308. The specifications management unit 308 registers the model name and firmware version with the model identification table 630 in the specifications storage unit 309 and then uses the value of the allocated model ID 631 to register the specifications information with the all setting specifications management table 650.

In S1123, the user interface control unit 301 uses the specifications information in the tgtDev information to generate the setting information edit screen 940. More specifically, the user interface control unit 301 acquires the value of the model ID 631 in the tgtDev information from the model Identification table 630 and extracts a record having the value as the value of the model ID 651 from the all setting specifications management table 650. Next, the values of the setting item name 653, type 654, and value range 655 in the record are used to display the corresponding setting information pieces on the setting information edit screen 940.

For example, the setting item name 653 is displayed as the item name of the setting information. The type 654 is used for verifying whether a set value input by an operator is matched with the type in the setting information or not. The value range 655 is used for verifying whether a set value input by an operator falls within a possible range of the setting information or not.

In S1124, the installation data generation unit 303 determines whether any setting information file is temporarily held in the installation data storage unit 307 or not. Here, if the installation data generation unit 303 determines that some setting information file is temporarily held, the processing moves to S1125. On the other hand, if the installation data generation unit 303 determines that no setting information file is temporarily held, the processing moves to S1128.

In S1125, the installation data generation unit 303 reads out setting information from the setting information file. From the setting information file 800, for example, the setting information includes a tag within a <Data> tag and its value (such as a <SleepTime> tag and its value "10").

In S1126, the user interface control unit 301 uses the specifications information in the refDev information to generate set values for displaying a user interface from the setting information within the setting information file 800. The <SleepTime> tag and its value "10" in the setting information file 800 will be described as an example. First of all, the user interface control unit 301 acquires the value of the model ID 631 in the refDev information from the model identification table 630.

A record having the value as the value of the model ID 651 and having the setting item ID matched to the tag name "SleepTime" is extracted from the all setting, specifications management table 650. Next, the value range 845 and the value of the value display name 656 in the record are used to generate "10 (MIN.)" that is a value of the setting information for user interface display from the value "10" of the <SleepTime> tag.

In S1127, the user interface control unit 301 changes the set value for user interface display generated in S1126 above to the initial value for user interface display of the tgtDev information. The setting item and set value for user interface display in the refDev information generated in S1126 above will be described more specifically. First, the user interface control unit 301 acquires the value of the model ID 631 in the tgtDev information from the model identification table 630.

A record having the value as the value of the model ID 651 and having the setting item ID matched to "SleepTime" is extracted from the all setting specifications management table 650. Next, whether the set value "10 (MIN.)" generated in S1126 above exits in the value display name 656 of the record or not is checked. If so, the set value "10 (MIN.)" is selected as the initial value for user interface display in the tgtDev information. If not, the value of the initial value 657 in the record is extracted, and the initial value for user interface display is determined from the value range 655 and the value display name 656.

If a record having the setting item ID matched to "SleepTime" does not exist in the all setting specifications management table 650, the setting item does not exist in the device with the tgtDev information. Therefore, the corresponding setting information piece is not displayed on the setting information edit screen 940.

In S1128, the user interface control unit 301 reads out the initial values from the specifications information of the tgtDev information. The user interface control unit 301 acquires the value of the model ID 631 in the tgtDev information from the model identification table 60. Next, a record having the value as the value of the model ID 651 is extracted from the all setting specifications management table 650. Finally, values of records of the setting item name 653, type 654, value range 655, value display name 656, and initial value 657 are used to generate initial values for user interface display of the tgtDev information.

In S1129, the user interface control unit 301 sets the initial values generated in S1127 or S1128 as the values of the setting items an the setting information edit screen 940 generated in S1123 above. When the user interface control unit 301 sets the initial values generated in S1127 above, initial values of the setting items displayed on the setting information edit screen 940 may not be generated. For example, it corresponds to a case where the number of setting information pieces within a setting information file is lower than the number of setting items of the target device 106. In this case, the user interface control unit 301 generates the initial value of a setting item which has not been generated yet by performing the way as in S1128 and sets it as the value of the setting item on the setting information edit screen 940. The flowchart has been described up to this point.

Referring back to FIG. 11A, subsequent to the user interface generation processing in S1105, the user interface control unit 301 in S1106 receives an editing operation performed by an operator on the setting information edit screen 940. In S1107, the user interface control unit 301 determines whether an OK button 946 is pressed or not. If the user interface control unit 301 determines that the OK button 946 is pressed, the processing moves to S1109. On the other hand, if the user interface control unit 301 determines that the OK button 946 is not pressed, the processing moves to S1108.

In S1108, the user interface control unit 301 determines whether a cancel button 947 is pressed or not. Here, if the user interface control unit 301 determines that the cancel button 947 is pressed, the user interface control unit 301 abandons an editing result on the setting information edit screen 940, and the setting information edit screen 940 is closed. On the other hand, if the user interface control unit 301 determines that the cancel button 947 is not pressed, the processing returns to S1106, and the editing operation on the setting information edit screen 940 continues.

In S1109, the user interface control unit 301 acquires setting information input on the setting information edit screen 940 by an operator. More specifically, the setting item name and set value of a setting information piece having its check box selected are acquired.

In S1110, the installation data generation unit 303 receives the setting information piece acquired in S1109 above from the user interface control unit 301. After that, specifications information in the tgtDev information is used to generate a setting information file such as the setting information file 800.

More specifically, the installation data generation unit 303 acquires the value of the model ID 631 in the tgtDev information from the model identification table 630. Next, a record having the value as the value of the model ID 651 is extracted from the all setting specifications management table 650. With respect to a record having a value of the setting item name 653 matched to the setting item name in the setting information piece acquired in S1109 above, a set value to be written in the setting information file is derived from the value range 655 and the value display name 656. The value of the setting item ID 652 is also acquired, and a tag name to be written in the setting information file is determined. Furthermore, values of the model name and the firmware version in the tgtDev information are acquired and are applied as the values of the <Model> tag and the <FWV> tag.

The generated setting information file is temporarily held in the installation data storage unit 307. The flowchart has been described up to this point.

Figure 12:
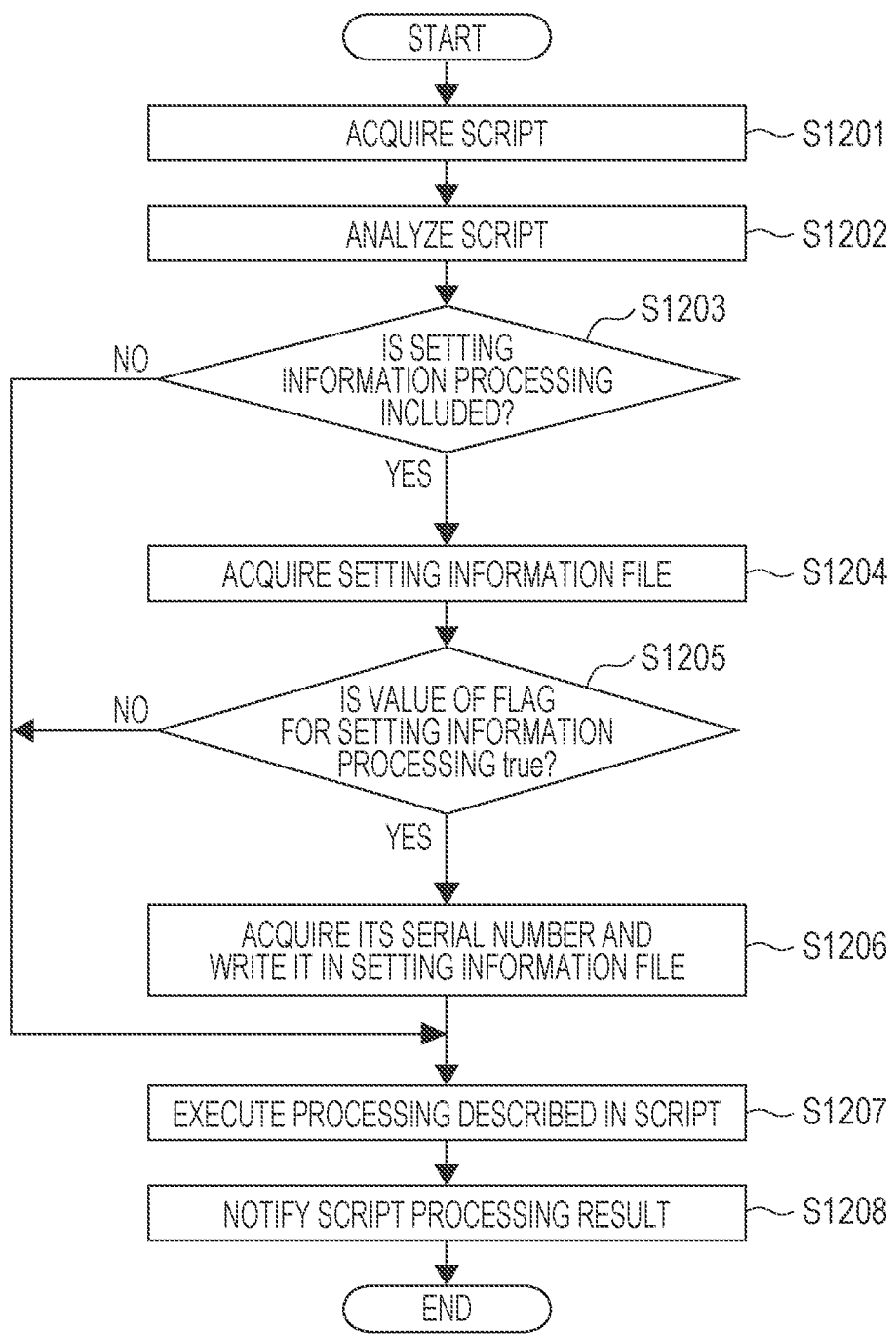
FIG. 12 is a flowchart illustrating a control method for an information processing device according to one embodiment.

In a case where the initial installation processing of the target device 106 is performed by using the installation data generated by executing the flowcharts in FIGS. 10A and 10B and FIGS. 11A and 11B, the target device 106 executes a flowchart in FIG. 12.

FIG. 12 is a flowchart illustrating a control method for the information processing device according to this embodiment. This embodiment corresponds to an initial setting processing example in the information processing device. Step therein are implemented by execution of a stored control program (automatic installation program 450) by the CPU 251.

When the automatic installation program 450 is activated on the target device 106 that is the information processing device, the user interface screen 470 is displayed. On this screen, when the OK button 472 is pressed with an installation data ID input in the installation data ID input area 471, the processing in S1201 is performed.

In S1201, the processing execution unit 453 transmits a script acquisition request to the installation data management device 101 through the communication unit 452 along with the value of the installation data ID. The communication unit 452 receives the script responded from the installation data management device 101 and supplies it to the script analysis unit 454.

In S1202, the script analysis unit 454 analyzes the script and supplies the result to the processing execution unit 453. For example, the initial installation processing described in the script 820 may include (1) a firmware update process, (2) a setting information process, and (3) a reboot process. Based on the order attributes of the processes, the processing order is (1), (2), and (3). In the (2) setting information process, the value of the flag attribute is "true", and the value of the setting information ID is "S001".

In S1203, the processing execution unit 453 determines whether the script analysis result in S1202 above includes the setting information process or not. Here, if the processing execution unit 453 determines that the setting information process is included, the processing moves to S1204. On the other hand, if the processing execution unit 453 determines the setting information process is not included, the processing moves to S1207.

In S1204, the processing execution unit 453 transmits a setting information acquisition request to the installation data management device 101 through the communication unit 452 along, with the value of the installation data ID and the value of the setting information ID. The installation data management device 101 identifies the setting information piece from the setting information ID, converts it to a file, and responds with the file. The communication unit 452 receives the setting information piece responded from the installation data management device 101 and temporarily holds it in the RAM 253 or the HDD 254.

In S1205, the processing execution unit 453 determines whether the value of the flag attribute of the setting information process is "true" or not from the script analysis result in S1202 above.

If the processing execution unit 453 determines that the value of the flag attribute is "true", the processing moves to S1206. On, the other hand, if the processing execution unit 453 determines that the value of the flag attribute is "false", the processing moves to S1207.

In S1206, the processing execution unit 453 acquires a serial number stored in the ROM 252 through the extension program system service 406. After that, the serial number is set in the <SN> tag in the setting information file acquired in S1204.

The processing in this step is executed so that the processing execution unit 453 can match the serial number of the setting information piece and the serial number of the target device 106. Thus, the processing execution unit 453 can reflect all of the setting information pieces edited on the setting information edit screen 940 in S1207 to the target device 106.

In S1207, the processing execution unit 453 uses the script analysis result in S1202 above to execute the processes. According to this embodiment, three processes of the (1) firmware update process, the (2) setting information process, and the (3) reboot processing are executed.

In the firmware update process, the processing execution unit 453 acquires the values of the model name of the <Model> tag and the firmware version of the <firmwareVersion> tag.

After that, a firmware acquisition request along with the values are transmitted to the content management device 102 through the communication unit 452. The communication unit 452 receives the firmware program from the content management device 102 in response to the firmware acquisition request, and holds it in the RAM 253 or the HDD 254. After that, the processing execution unit 453 invokes the firmware update service 403 to update the firmware program.

In the setting information process, the processing execution unit 453 supplies the setting information file to the setting management service 405 through the extension program system service 406. The setting management service 405 changes the setting information in the native programs 401 by the procedure as illustrated in FIG. 4B.

The <IF address> tag in the setting information file 800 will be described, for example, for specifically describing the processing for changing setting information by the setting management service 405.

First of all, as illustrated in FIG. 4B, the designation data analysis unit 421 in the setting management service 405 analyzes the setting information file and extracts the serial number and the model name. An <IF address> tag is extracted as a setting information example.

The reflection policy determination unit 422 acquires the serial number and model name of the target device 106 through the native programs 401 and compares them with extracted the serial number and model name. The comparison result includes one or more of "serial number matched", "model name matched", and "no condition". For example, if the serial number and the model name are matched, the comparison result includes all of "serial number matched", "model name matched", and "no condition".

If the serial number is not matched and the model name is matched, the comparison result includes two of "model name matched" and "no condition". According to this embodiment, if the serial number and the model name are matched, the value of the condition ID 501 from the acquisition condition table 500 may be "1", "2", or "3". This means that the reflecting unit 424 can reflect the setting information with the condition ID 517 "1", "2", or "3" in the setting specifications management table 510.

On the other hand, according to this embodiment, because the tag names in the setting information file 800 are identical to the values of the setting item IDs 511, the reflecting unit 424 can search through the setting specifications management table 510 by using the tag name "IP address" as a search key.

When a record having "IP address" as the setting item ID 511 is searched, the reflecting unit 424 detects the second record. The value of the condition ID 517 of this record is "1". According to this embodiment, the setting information piece having "1" as the value of the condition ID 517 is written in the native programs 401. In other words, a value "1.2.3.4" set in the <IF address> tag in the setting information file 800 is written to the native programs 401. Finally, the processing execution unit 453 executes the reboot process and reflects the changed setting to the target device 106.

Next, in S1208, the processing result in S1207 above is transmitted to the installation data management device 101. The installation data management device 101 stores the received processing result in the processing result (column 607).

According to this embodiment, the value of the flag is represented by a flag attribute provided in the <deviceConfigCommand> tag in the script 820. Alternatively, the value of the flag may be represented by a <flag> tag provided within the control in area 801 in the setting information file 800.

In this case, the processing execution unit 453 executes the processing in S1205 on the basis of an analysis result in the control information area 801 of the setting information file acquired in S1204 instead of execution of the processing in S1205 based on the script analysis result in S1202. According to this embodiment, the target device 106 executes the processing in S1206. However, in other embodiments, the installation data management device 101 may execute the processing. In such embodiments, when the processing execution unit 453 transmits a script acquisition request to the installation data management device 101 in S1201, the serial number of the target device 106 is notified to the installation data management device 101 along with the installation data ID.

The installation data management device 101 searches for target installation data on the basis of the received installation data ID if the value of the flag (column 612) is "true", the installation data management device 101 uses the received serial number to set the serial number in the <SN> tag in the target setting information file. The above description describes a first embodiment.

Second Embodiment

Generally, in a case where a device is to be newly installed in a client environment, two installation patterns are assumed.

In the first pattern, the reference device 105 in the client environment is replaced by the target device 106. That is, in the client environment, the reference device 105 and the target device 106 do not coexist. To operate as a successor of the reference device 105, the target device 106 is required to take over setting information from the reference device 105.

In the second pattern, the target device 106 is added to the client environment. In this situation, the reference device 105 and the target device 106 can coexist in the client environment. In such configurations, when a setting information piece specifically inherent to the reference device is reflected to the target device 106, a problem may occur in the client environment. An IP address is a typical example of the setting information which may be individually inherent.

According to the first embodiment, when an operator edits a setting information file, an individually inherent setting information piece can be reflected to a target device. Thus, the first embodiment can address the first pattern but may not support the second pattern for newly installing a device in a client environment.

According to this second embodiment, setting information can be reflected to a target device from a reference device without causing a problem in a client environment even in the second pattern.

The second embodiment has overlap with the first embodiment in terms of features. The discussion below will focus on the ways in which the second embodiment is different from the first embodiment.

FIGS. 13A and 13B illustrate installation data generation processing in a management device according to this second embodiment. FIG. 13A illustrates an example of an installation data management table 600 according to this embodiment. In the second embodiment, a column 1301 is added to the installation data management table 600.

Because the columns 601 to 607 in FIG. 13A are the same as those of the first embodiment, any repetitive description of those columns will be omitted.

The new column 1301 provides installation modes that are installation modes of devices to which installation data are applied. The column 1301 may possibly take a value of "add" or "replace", for example.

According to this embodiment, only one installation mode can be included in the installation data management table 600 and this installation mode can be designated for one installation data piece. Thus, in a case where a device having a different installation mode is installed in a client environment, an operator generates a plurality of installation data pieces for each installation mode. Alternatively, a table for managing a target device may be provided separately in which installation modes can be managed.

FIG. 13B illustrates an example of an edit screen 920 displayed on the management device according to this embodiment. It is different from the edit screen 920 according to the first embodiment in that it further displays an installation mode 1302.

Because the items 921 to 931 in FIG. 13B are the same as those of the first embodiment, any repetitive description will be omitted.

As noted above, the installation mode 1302 may possibly take a value "add" or "replace" in this embodiment. In order for the target device 106 to replace the reference device 105 in a client environment, the "replace" is selected for the installation mode 1302. When the target device 106 is added to a client environment, the value "add" is selected for the installation mode 1302 in the installation data management table 600.

Figure 14A:
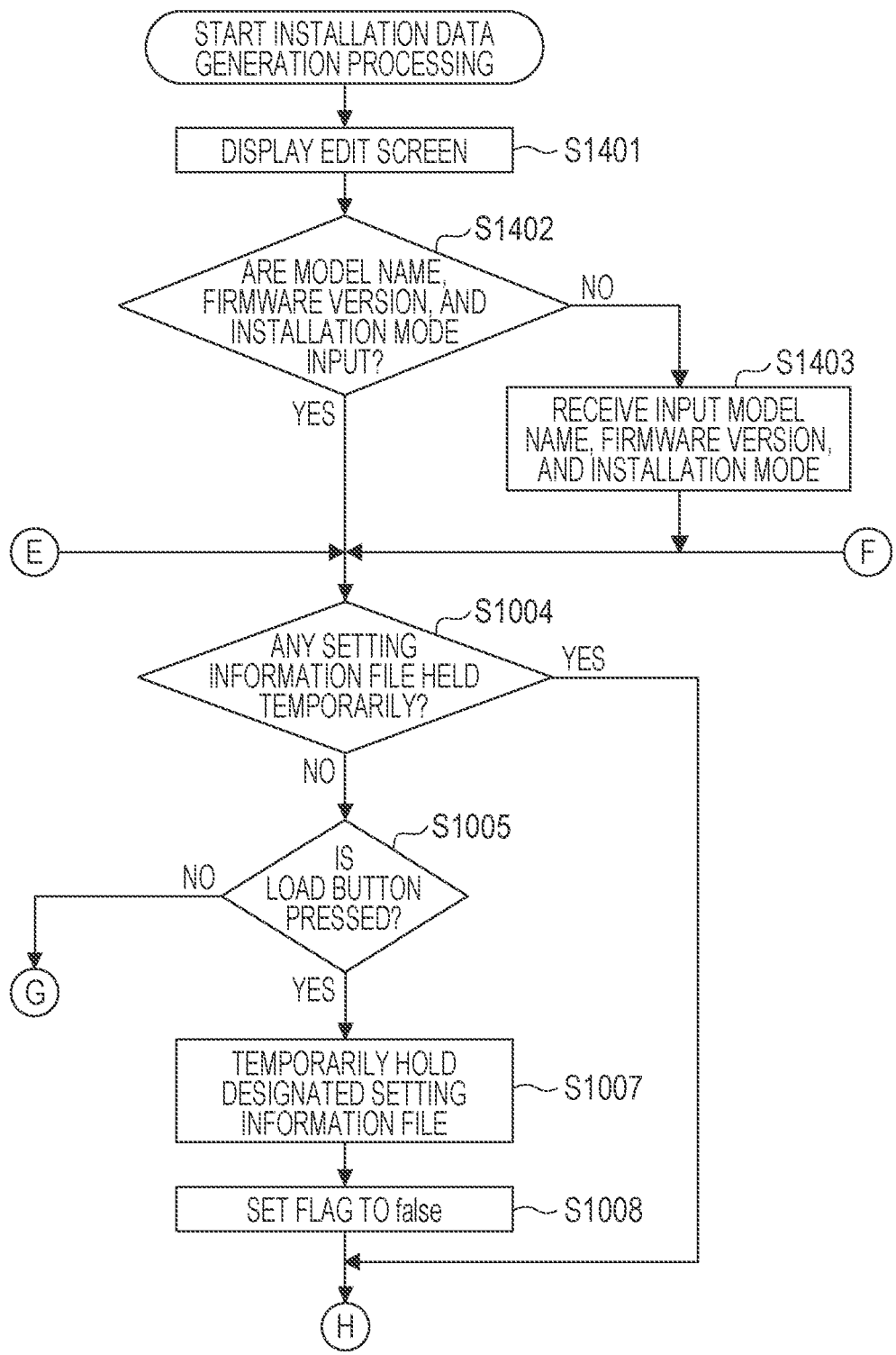
FIGS. 14A and 14B are a flowchart illustrating a control method for a management device according to one embodiment.
Figure 14B:
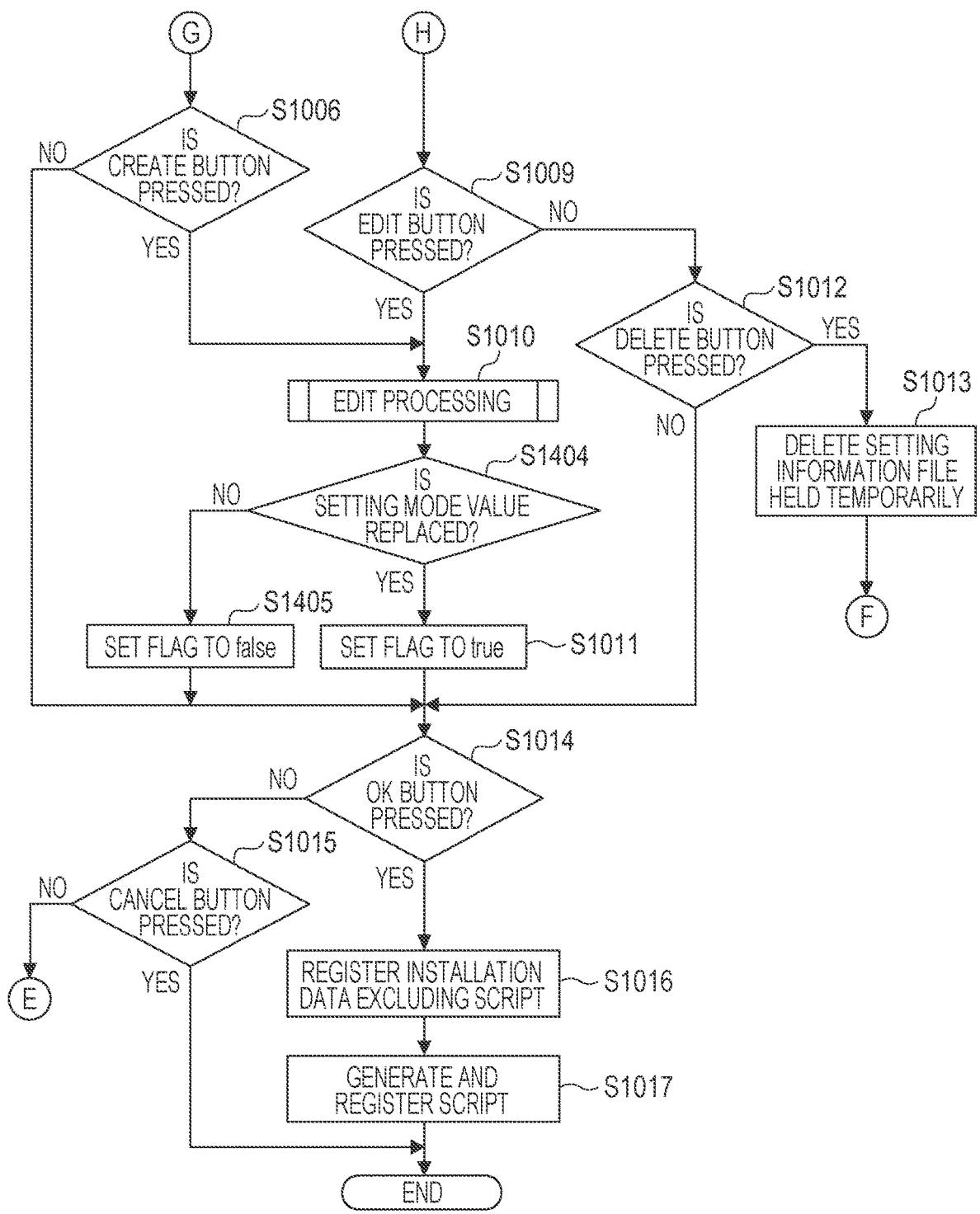

Like the first embodiment, when the create button 905 or the edit button 906 is pressed on the list screen 900, the installation data management device 101 executes the processing in the flowchart in FIGS. 14A and 14B.

FIGS. 14A and 14B are a flowchart illustrating a control method for a management device according to this embodiment. An installation data generation process example to be performed by the installation data management device 101 will be described according to this embodiment. The illustrated steps are implemented by execution of a stored control program (including the user interface control unit 301) by the CPU 201 in the installation data management device 101.

In S1401, the user interface control unit 301 displays the installation mode 1302 in addition to the processing in S1001 according to the first embodiment. If the create button 905 is pressed, the installation mode 1302 displays an initial value defined by the user interface control unit 301. An example of the edit screen 920 in FIG. 13B may display "replace", without being limited to displaying "add" as an initial value. On the other hand, if the edit button 906 is pressed, the user interface control unit 301 acquires a value of the installation mode (column 1301) in the installation data to be edited from the installation data management table 600 and displays it as an initial value.

In S1402, the user interface control unit 301 determines whether a value is input to the installation mode 1302 or not addition to the processing in S1002 according to the first embodiment. Here, if the user interface control unit 301 determines that a value is input, the processing moves to S1004. On the other hand, if the user interface control unit 301 determines that a value is not input, the processing moves to S1403.

In S1403, the user interface control unit 301 receives input of a value for the installation mode 1302 in addition to the processing in S1003 according to the first embodiment. Then, the processing moves to S1004. Because the processing in S1004 to S1010 is the same as the corresponding processing according to the first embodiment, any repetitive description will be omitted.

In S1404 subsequent to the processing in S1010, the user interface control unit 301 determines whether the value of the installation mode 1302 is "replace" or not. Here, if the user interface control unit 301 determines that the value of the installation mode 1302 is "replace", that is, the installation mode 1302 is a replacement mode, the processing moves to S1011. If the user interface control unit 301 determines that the value of the installation mode 1302 is not "replace", that is, the value of the installation mode 1302 is "add", the processing moves to S1405. Because the processing in S1011 is the same as the corresponding processing according to the first embodiment, any repetitive description will be omitted. According to this embodiment, the installation mode 1302 with the value "add" is called an add mode.

In S1405, the user interface control unit 301 temporarily holds "false" as a value of the flag in the installation data storage unit 307. After that, the processing moves to S1014. Because the processing from S1012 to S1017 is the same as the corresponding processing according the first embodiment, any repetitive description will be omitted. The flowchart in FIGS. 14A and 14B has been described up to this point.

An operator may operate the value of the installation mode 1302 on the edit screen 920 so that whether all setting information pieces in the setting information file are to be reflected to the target device 106 or not can be controlled, as described above. As a result, even when the target device 106 is added to a client environment, overlapped reflection of individually inherent setting information pieces between the target device 106 and the reference device 105 can be prevented. The second embodiment has been described up to this point.

Third Embodiment

Generally, an initial installation work may include procedures relating to (1) hardware installation, (2) software installation, and (3) final check.

The (1) hardware installation work is performed before the (2) software installation work. While a setting information of a device may sometimes be changed during a hardware adjustment work in the work (1), the adjusted setting information piece is changed when the setting information pieces are applied during the work (2). In this case, an operator may he required to perform the work (1) again.

According to this embodiment, an example will be described in which a setting information piece adjusted in advance can be protected from being changed in an initial installation process executed in procedures as described above. The below discussion will focus mainly on the differences the third embodiment has from the first embodiment.

A hardware device to be installed by the initial installation process is sometimes called an option.

FIGS. 15A to 15D illustrate setting data management processing in the management device according to this embodiment. FIGS. 15A to 15D illustrate table examples managed by the installation data management device 101.

FIG. 15A illustrates an example of a setting specifications management table 510 according to this embodiment. The example is different from the setting specifications management table 510 illustrated in FIG. 5B according to the first embodiment in that it further has a column 1501. Because the columns 511 to 517 are the same as those of the first embodiment, any repetitive description will be omitted.

The column 1501 provides associated option names, and each record therein stores a name of an associated option.

FIG. 15B illustrates an example of an installation data management table 600 according to this embodiment. The example is different from the installation data management table 600 according to the first embodiment in that it further has a column 1502. Because the columns 601 to 607 are the same as those of the first embodiment, any repetitive description will be omitted.

The column 1502 is provided optionally and enumerates options to be mounted in the device to which the installation data are applied.

According to this embodiment, it is configured such that one installation data piece only includes a combination of options that can be designated. Thus, in a case where a device having a different option is to be installed, an operator may be required to generate a plurality of installation data pieces for each combination of options. Alternatively, a table for managing target devices may be provided separately to manage options therein.

FIG. 15C illustrates an example of an all setting specifications management table 650 according to this embodiment. The all setting specifications management table 650 for this embodiment is different from the all setting specifications management table 650 according to the first embodiment in that it further has a column 1503.

Because the columns 651 to 658 are the same as those of the first embodiment, any repetitive description will be omitted. Because the column 1503 is the same as the column 1501 in FIG. 15A, any repetitive description will be omitted.

Figure 15D:
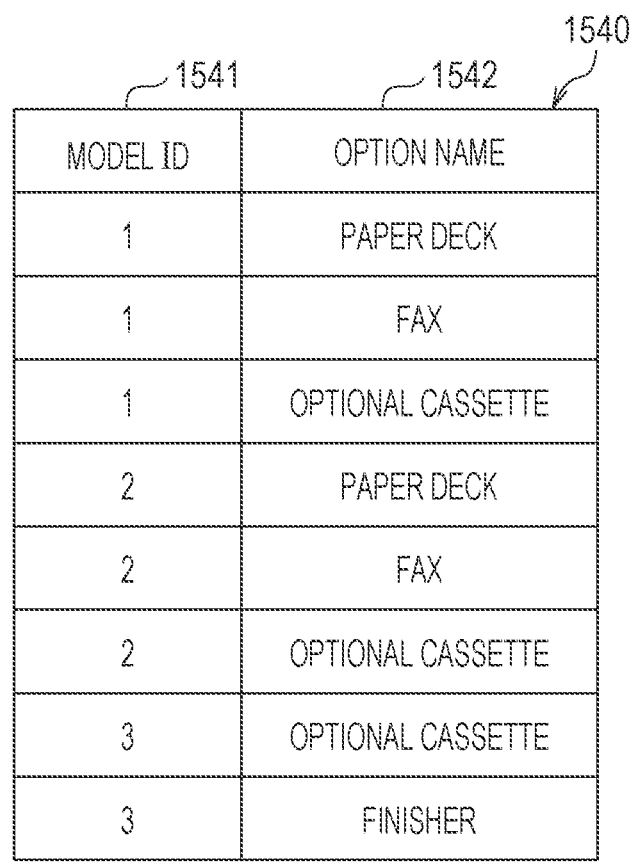

FIG. 15D illustrates an option table 1540 having columns 1541 to 1542. The column 1541 provides model IDs which are the same as the model IDs 631 according to the first embodiment.

The column 1542 provides option names and enumerates option names that can be added to models identified by corresponding model IDs.

FIGS. 16A and 16B illustrate edit screens displayed by the management device according to this embodiment. Particularly, FIG. 16A illustrates an example of an edit screen 920 according to this embodiment.

It is different from the edit screen 920 according to the first embodiment in that it further has option selections 1601 usable for optionally designating a specific device function. Because the items 921 to 931 are the same as those of the first embodiment, any repetitive description will be omitted.

FIG. 16A illustrates the option selections 1601. The user interface control unit 301 determines a model ID from the model identification table 630 by using the model name 922 and the firmware version 923. Next, an option name matched to the model ID is extracted from the option table 1540 and is enumerated in the option selections 1601 along with a check box.

FIG. 16B illustrates an example of a setting information edit screen 940 according to this embodiment. Because the components 941 to 944 and 946 and 947 are the same as those of the first embodiment, any repetitive description will be omitted.

FIG. 16B has a cassette margin adjustment input area 1602. This setting information piece, that is, the cassette margin adjustment input area 1602 is grayed out. Details of the control of the display form of a setting information piece will be described below.

Figure 17A:
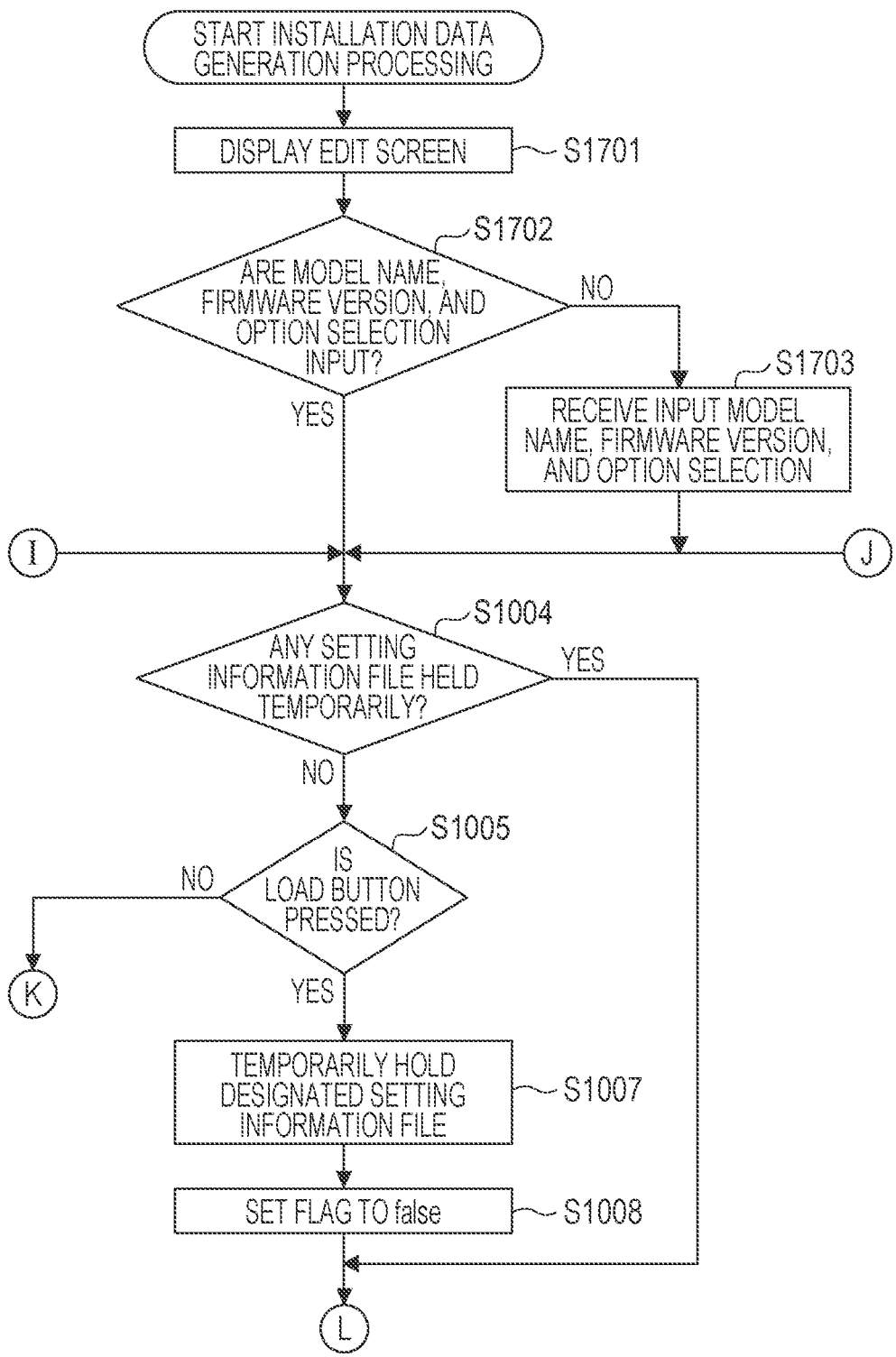
FIGS. 17A and 17B are a flowchart illustrating a control method for a management device according to one embodiment.
Figure 17B:
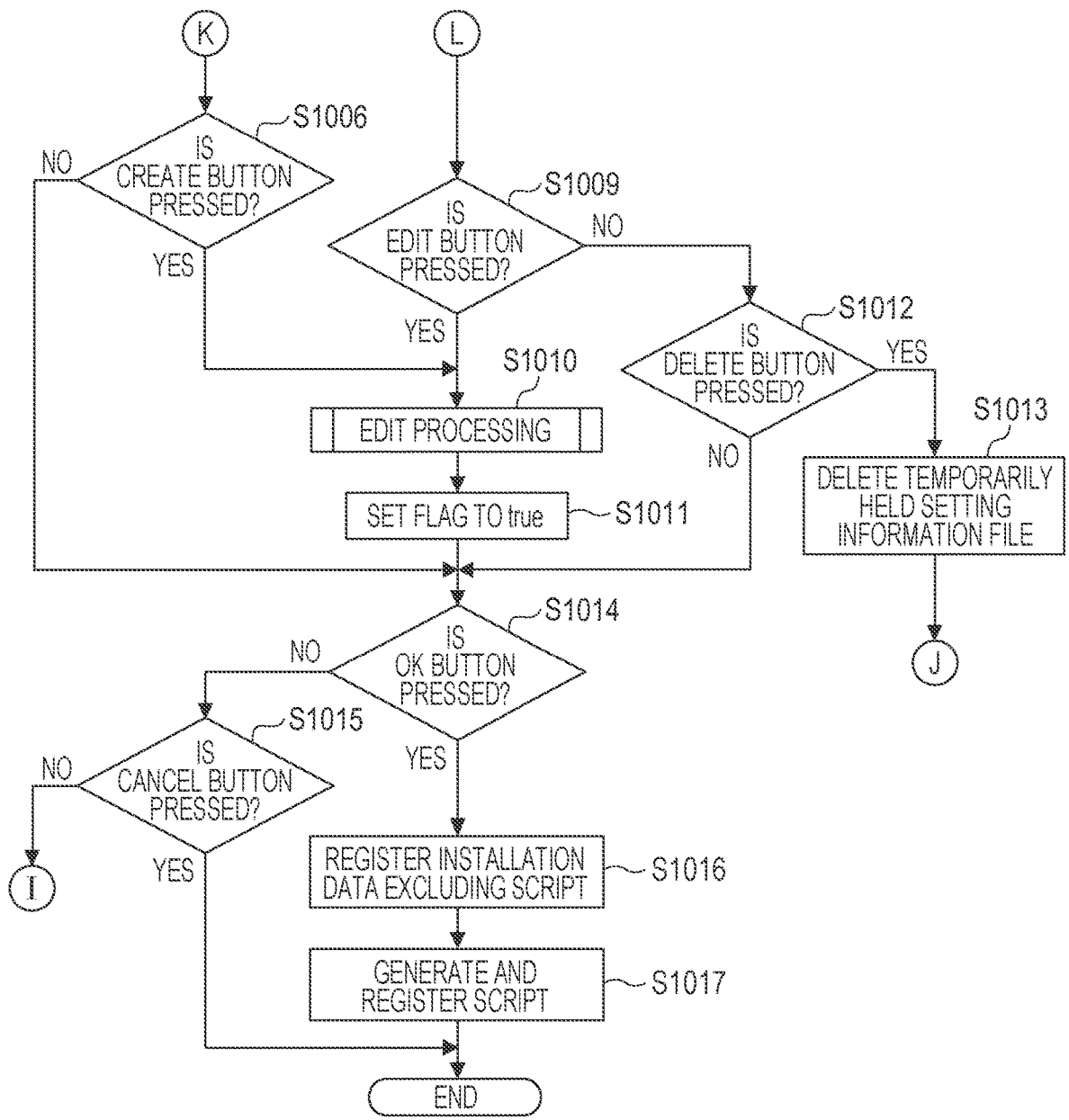

Like the first embodiment, when the create button 905 or the edit button 906 is pressed on the list screen 900, the installation data management device 101 executes processing in the flowchart in FIGS. 17A and 17B.

FIGS. 17A and 17B are a flowchart illustrating a control method for the management device according to this embodiment. The control method includes an installation data generation procedure in the installation data management device 101. The illustrated steps are implemented by execution of a stored control program by the CPU 201 in the installation data management device 101.

In S1701, in addition to the processing in S1001 according to the first embodiment, the user interface control unit 301 displays the option selections 1601 by performing the procedure illustrated in FIGS. 16A and 16B. If the user interface control unit 301 determines that the create button 905 is pressed, check boxes for the option selections 1601 are displayed in a form defined by the user interface control unit 301. Normally, the check boxes are displayed in a deselected state.

On the other hand, if the user interface control unit 301 determines that the edit button 906 is pressed, the user interface control unit 301 acquires the value of an option (column 1502) of an installation data pieces to be edited from the installation data management table 600 according to embodiment and displays an item corresponding to the option selection 1601 in a selected state.

In S1702, the user interface control unit 301 determines whether the value of at least one of the option selections 1601 is input or not in addition to the processing in S1002 according to the first embodiment. Here, if the user interface control unit 301 determines that at least one value is input, the processing moves to S1004. If the user interface control unit 301 determines that no value is input, the processing moves to S1703.

In S1703, the user interface control unit 301 receives the input value or values for the option selection or options 1601 in addition to the processing in S1003 according to the first embodiment. Then, the processing returns to S1702. Because the processing in S1004 to S1017 is the same as the corresponding processing according to the first embodiment, any repetitive description will be omitted. The flowchart in FIGS. 17A and 17B has been described up to this point.

Next, details of S1105 in which user interface generation processing according to this embodiment is performed will be described with reference to FIG. 18.

Figure 18:
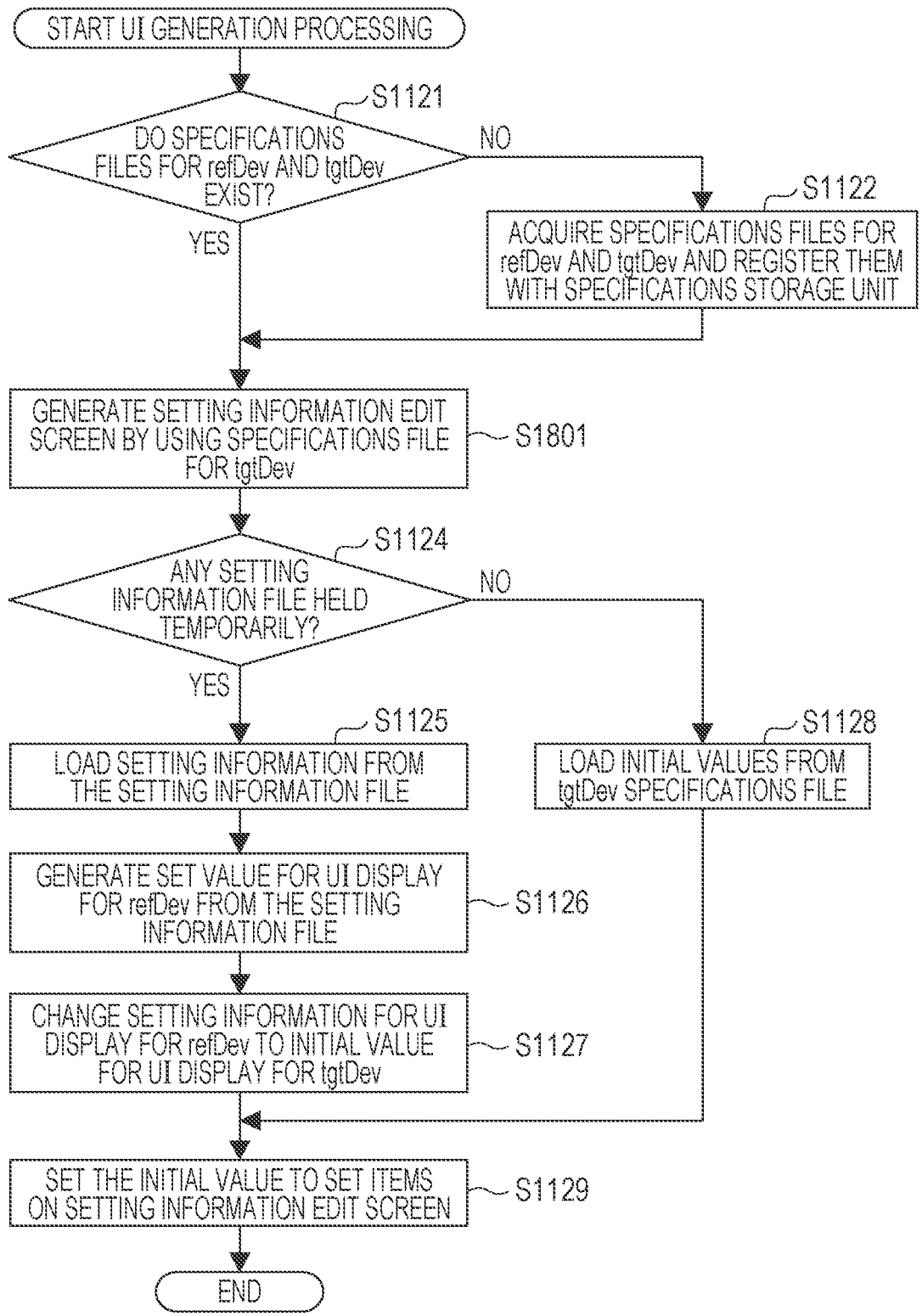
FIG. 18 is a flowchart illustrating a control method for a management device according to one embodiment.

FIG. 18 is a flowchart illustrating a control method for a management device according to this embodiment. The control method includes a user interface generation processing procedure in the installation data management device 101. The illustrated steps are implemented by execution of a stored control program by the CPU 201 in the installation data management device 101. Because the processing in S1121 to S1122 and S1124 to S1129 is the same as the corresponding processing according to the first embodiment, any repetitive description will be omitted.

In S1801, in addition to the processing in S1123 according to the first embodiment, the user interface control unit 301 generates a setting information edit screen 940 by using a value or values for the option selection or selections 1601 input by an operator on the edit screen 920.

More specifically, the user interface control unit 301 identifies the record in the all setting specifications management table 650 by performing the same procedure as that in S1123. Next, the user in control unit 301 changes the display form of a setting information piece if the value of the associated option (column 1503) is matched to the option designated among the option selections 1601. In other words, the user interface control unit 301 performs display control such that an editing instruction for an option designation on the user interface screen illustrated in FIG. 16 is not received.

According to this embodiment, the display form is grayed out for controlling between display and nondisplay. A column for designating a control method may be provided separately. The flowchart in FIGS. 17A and 17B has been described up to this point.

After that, as in S1109 or S1110 according to the first embodiment, a setting information file including selected setting information pieces is generated. Having described this embodiment with reference to differences from the first embodiment, this embodiment can also be described with reference to the second embodiment.

Controlling values of the option selections 1601 on the edit screen 920 can control the display forms of setting items on the setting information edit screen 940. Setting information pieces to be saved in a setting information file can also be controlled. As a result, adjusted setting information can be protected from being changed even in a case where an operator applies the setting information file after a hardware adjustment to the target device 106.

According to this embodiment, after the setting information file is applied, an operator may confirm settings for a target device and eliminate the necessity for manual correction thereon, which can make the initial installation work more efficient.

The information processing device can complete the initialization processing including specific items to be set by itself in accordance with an instruction describing the automatic setting procedure.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While various embodiments have been described with reference to exemplary embodiments, the scope of the following claims is to be accorded the broadest interpretation so as to encompass all such modifications and equivalent structures and functions.

This application claims the benefit of Japanese Patent Application No. 2016-039057 filed Mar. 1, 2016, which is hereby incorporated by reference herein in its entirety.

What is claimed is:

1. A system comprising a management device and an information processing device, the management device and the information processing device being communicably connected, the management device comprising:
one or more first processors; and
one or more first memories storing a first program which, when executed by the one or more first processors, causes the management device to:
acquire a setting information file set in another information processing device;
receive an instruction of editing the acquired setting information file from a user, to use the setting information file for automatic installation processing in the information processing device; and
transmit the edited setting information file;
the information processing device comprising:
one or more second processors; and
one or more second memories storing a second program which, when executed by the one or more second processors, causes the information processing device to:

execute the automatic installation processing by using the setting information file acquired from the management device; and store conditions for whether each setting item in the setting information file is set to the information processing device, wherein every setting item in the setting information file is set to the information processing device irrespective of the conditions, in a case where information indicating that the setting information file acquired from the management device has been edited is added to the setting information file.

2. The system according to claim 1, wherein the first program, when executed by the one or more first processors, further causes the management device to:

receive, from a user, the instruction of editing a specific designatable item in the setting information file set by the another information processing device;

generate a setting procedure instruction describing an automatic setting procedure to be executed by the information processing device, from the edited setting information file; and respond to an acquisition request received from the information processing device by transmitting a setting information file identified by the acquisition request, the acquisition request sent by the information processing device in response to execution of the automatic setting procedure instruction by the information processing device;

wherein the second program, when executed by the one or more second processors, further causes the information processing device to:

analyze the automatic setting procedure instruction acquired from the management device;

acquire from the management device, the analyzed setting information file identified by the automatic setting procedure instruction;

detect a specific item from the acquired setting information file;

set device information managed by the information processing device corresponding to the detected specific item; and notify the management device in a case where the automatic installation processing has been completed, wherein the set device information is used to execute the automatic installation processing based on the setting information file.

3. The system according to claim 2, wherein the first program, when executed by the one or more first processors, further causes the management device to:

determine whether an installation mode for applying the instruction is a replacement mode or add mode;

wherein, in a case where it is determined the installation mode is the replacement mode, the setting information file is edited to exclude the specific setting item set by the information processing device, and in a case where it is determined that the installation mode is the add mode, the setting information file is edited to include the specific setting item set by the information processing device.

4. The system according to claim 2, wherein the first program, when executed by the one or more first processors, further causes the management device to:

display an edit screen enabling the setting information file to be edited;

determine whether a specific device function is optionally designated on the edit screen or not; and control displaying the edit screen, in a case where it is determined that the specific device function is designated as an option, to accept an editing instruction to the designated option displayed on the edit screen.

5. The system according to claim 2, wherein the device information managed by the information processing device includes a device name and a device number.

6. The system according to claim 2, wherein the information processing device has a storage unit configured to store a device name and a device number usable for identifying the information processing device; and wherein the device name and the device number read out from the storage unit are set for the detected specific item.

7. An information processing device communicably connected to a management device, the information processing device comprising:

one or more processors; and one or more memories storing a program which, when executed by the one or more processors, causes the information processing device to:

acquire setting information file from the management device;

execute an automatic installation processing by using the acquired setting information file; and store conditions for whether each setting item in the setting information file is set to the information processing device, wherein every setting item in the setting information file is set to the information processing device irrespective of the conditions, in a case where information indicating that the setting information file acquired from the management device has been edited is added to the setting information file.

8. A control method for an information processing device communicably connected to a management device, the control method comprising:

acquiring setting information file from the management device;

executing the automatic installation processing by using the acquired setting information file; and storing conditions for whether each setting item in the setting information file is set to the information processing device, wherein every setting item in the setting information file is set to the information processing device irrespective of the conditions, in a case where information indicating that the setting information file acquired from the management device has been edited is added to the setting information file.

9. A non-transitory computer-readable medium storing a program that, when executed, causes a computer to:

acquire setting information file from the management device;

execute an automatic installation processing by using the acquired setting information file; and store conditions for whether each setting item in the setting information file is set to the information processing device, wherein every setting item in the setting information file is set to the information processing device irrespective of the conditions, in a case where information indicating that the setting information file acquired from the management device has been edited is added to the setting information file.

10. The non-transitory computer-readable medium according to claim 9, wherein the stored program further causes the computer to:

analyze the automatic setting procedure instruction acquired from the management device;

acquire from the management device, the analyzed setting information file identified by the automatic setting procedure instruction;

detect a specific item from the acquired setting information file;

set device information managed by the information processing device corresponding to the detected specific item; and notify the management device in a case where the automatic installation processing has been completed, wherein the set device information is used to execute the automatic installation processing based on the setting information file.

11. A system comprising a management device and an information processing device, the management device and the information processing device being communicably connected, the management device comprising:

one or more first processors; and one or more first memories storing a first program which, when executed by the one or more first processors, causes the management device to:

prepare a setting information including setting items for installation processing in the information processing device; and transmit the setting information;

the information processing device comprising:

one or more second processors; and one or more second memories storing conditions, wherein the installation processing is executed according to the conditions, and a second program which, when executed by the one or more second processors, causes the information processing device to execute the installation processing, by using the setting information transmitted by the management device, wherein at least one setting item in the setting information is not set to the information processing device according to the conditions, wherein the at least one setting item in the setting information is set to the information processing device irrespective of the conditions, in a case where the transmitted setting information includes information for setting the at least one setting item for the information processing device.

* * * * *